(12) United States Patent
Byrne

(10) Patent No.: US 7,878,845 B2
(45) Date of Patent: Feb. 1, 2011

(54) ELECTRICAL FLOOR ACCESS MODULE SYSTEM

(76) Inventor: Norman R. Byrne, 2736 Honey Creek NE., Ada, MI (US) 49301

( * ) Notice: Subject to any disclaimer, the term of this patent is extended or adjusted under 35 U.S.C. 154(b) by 542 days.

(21) Appl. No.: 11/913,493

(22) PCT Filed: May 3, 2005

(86) PCT No.: PCT/US2005/015172

§ 371 (c)(1), (2), (4) Date: Nov. 2, 2007

(87) PCT Pub. No.: WO2006/118568

PCT Pub. Date: Nov. 9, 2006

(65) Prior Publication Data

US 2009/0301774 A1 Dec. 10, 2009

(51) Int. Cl.
H02G 3/08 (2006.01)
E04B 5/00 (2006.01)

(52) U.S. Cl. .................. 439/535; 52/263; 52/220.8; 174/64; 174/486

(58) Field of Classification Search ............ 174/59, 174/64, 486, 520; 52/220.8, 263; 439/215, 439/535, 654, 650
See application file for complete search history.

(56) References Cited

U.S. PATENT DOCUMENTS

| | | | | |
|---|---|---|---|---|
| 2,811,574 A * | 10/1957 | Guerrero | ................. | 174/57 |
| 3,131,512 A * | 5/1964 | Macleod, Jr. | ............... | 52/220.5 |
| 3,433,886 A * | 3/1969 | Myers | ................. | 174/57 |
| 3,794,956 A * | 2/1974 | Dubreuil | ................. | 439/131 |
| 4,146,287 A * | 3/1979 | Jonsson | ................. | 439/368 |
| 4,536,612 A * | 8/1985 | Domigan | ................. | 174/489 |
| 4,740,167 A * | 4/1988 | Millhimes et al. | ............ | 439/92 |
| 4,864,078 A * | 9/1989 | Bowman | ................ | 174/486 |
| 4,967,041 A * | 10/1990 | Bowman | ................ | 174/135 |
| 5,053,637 A * | 10/1991 | Dillard | ................. | 307/147 |
| 5,057,647 A * | 10/1991 | Bogden et al. | ............ | 174/482 |
| 5,122,069 A * | 6/1992 | Brownlie et al. | ............ | 439/131 |
| 5,149,277 A * | 9/1992 | LeMaster | .................. | 439/207 |
| 5,178,555 A * | 1/1993 | Kilpatrick et al. | ............ | 439/215 |
| 5,468,908 A * | 11/1995 | Arthur et al. | ................. | 174/482 |
| 5,575,668 A * | 11/1996 | Timmerman | ................ | 439/131 |
| 5,593,317 A * | 1/1997 | Humbles | ................. | 439/502 |
| 5,941,720 A * | 8/1999 | Byrne | ................. | 439/215 |
| 6,028,267 A * | 2/2000 | Byrne | ................. | 174/59 |
| 6,036,516 A * | 3/2000 | Byrne | ................. | 439/215 |
| 6,102,229 A * | 8/2000 | Moncourtois | ............... | 220/3.3 |
| 6,162,071 A * | 12/2000 | Muller | ................. | 439/142 |
| 6,274,809 B1 * | 8/2001 | Pudims et al. | ............ | 174/486 |
| 6,290,518 B1 * | 9/2001 | Byrne | ................. | 439/131 |

(Continued)

FOREIGN PATENT DOCUMENTS

EP   0 881 729 A2 * 12/1998

(Continued)

Primary Examiner—Robert J Canfield

(57) ABSTRACT

An electrical system (500) is positioned beneath an access floor (30) and includes a number of access floor modules (502) for providing electrical power locations for energizing electrical devices. Cable assemblies (578) electrically interconnect the modules (502) to the power source and to each other. Junction blocks (518) are mechanically connected to the access floor modules (502). Electrical receptacle blocks (562) are electrically interconnected to the junction blocks (518) for supplying power to interconnected electrical devices.

32 Claims, 22 Drawing Sheets

U.S. PATENT DOCUMENTS

| | | | |
|---|---|---|---|
| 6,518,498 B1 * | 2/2003 | Bonilla et al. | 174/484 |
| 7,045,706 B1 * | 5/2006 | Lincoln et al. | 174/482 |
| 7,183,504 B2 * | 2/2007 | Byrne | 174/486 |
| 7,410,373 B2 * | 8/2008 | Isaacks | 439/142 |
| 7,465,178 B2 * | 12/2008 | Byrne | 439/215 |
| 7,641,510 B2 * | 1/2010 | Byrne | 439/514 |
| 2003/0106701 A1 * | 6/2003 | Riner | 174/48 |
| 2004/0080903 A1 * | 4/2004 | Byrne | 361/683 |
| 2008/0188106 A1 * | 8/2008 | Byrne | 439/215 |
| 2008/0200050 A1 * | 8/2008 | Byrne | 439/131 |
| 2008/0214033 A1 * | 9/2008 | Byrne | 439/215 |
| 2008/0254661 A1 * | 10/2008 | Byrne | 439/215 |
| 2008/0280475 A1 * | 11/2008 | Byrne | 439/284 |
| 2009/0142947 A1 * | 6/2009 | Byrne | 439/131 |

FOREIGN PATENT DOCUMENTS

| | | |
|---|---|---|
| EP | 1 085 631 A1 * | 3/2001 |
| WO | 2006/138285 A2 * | 12/2006 |

* cited by examiner

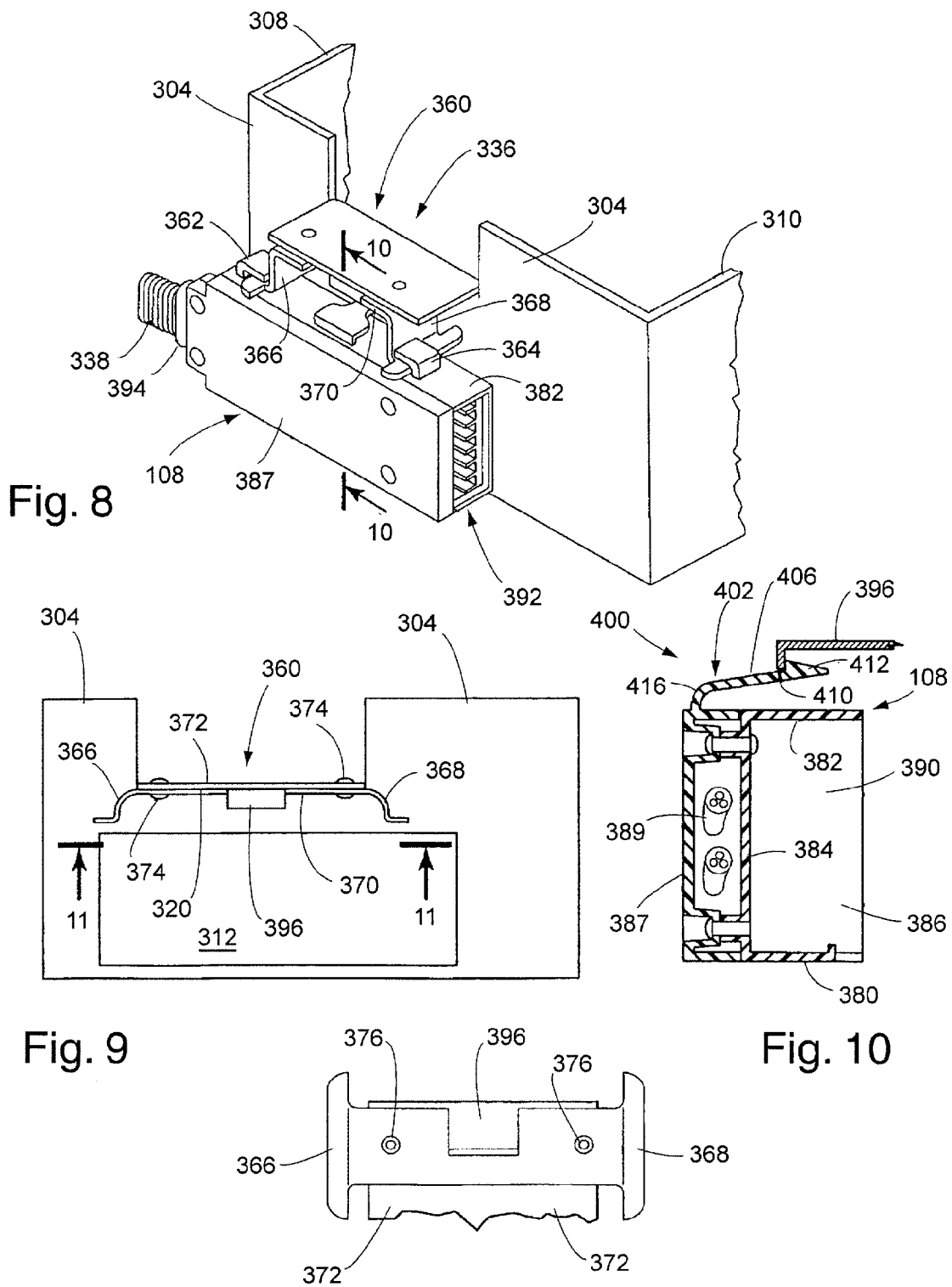

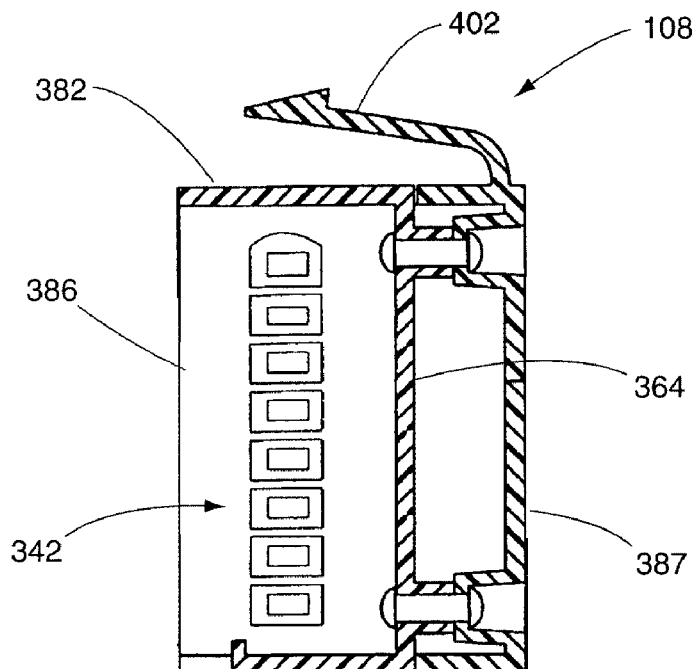
Fig. 13
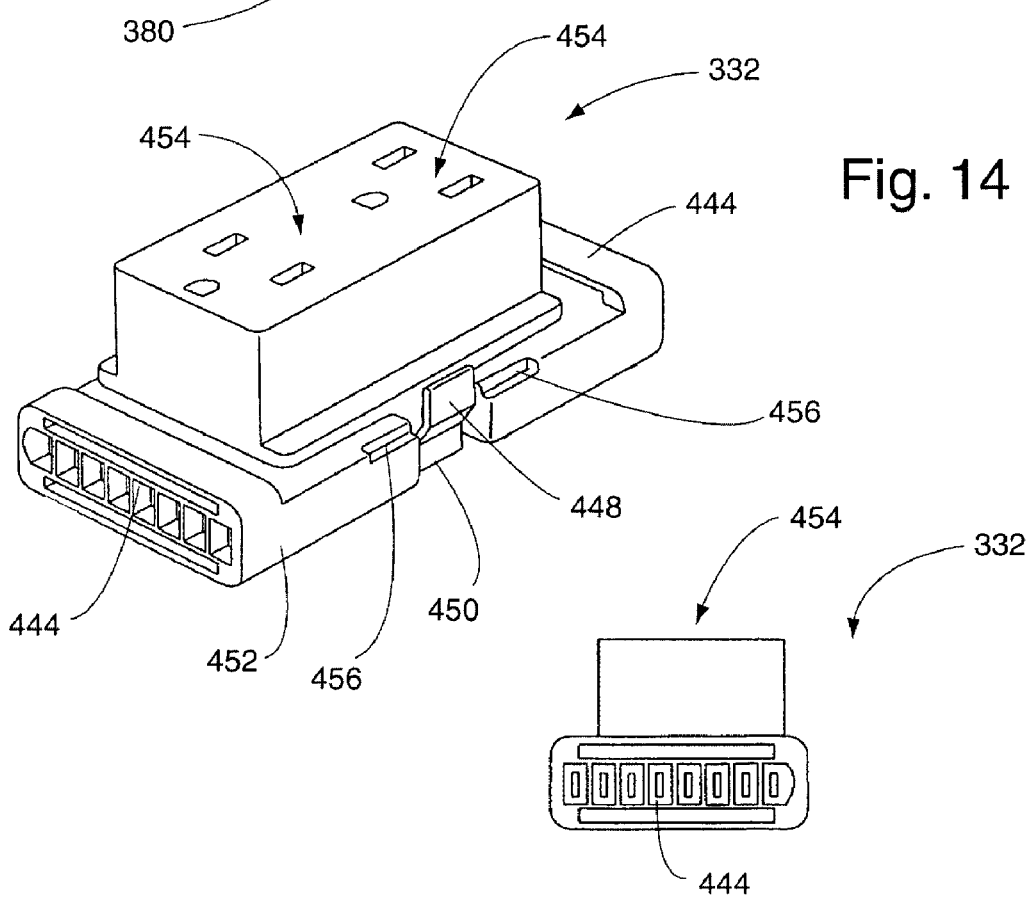
Fig. 14
Fig. 15

ELECTRICAL FLOOR ACCESS MODULE SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to electrical power systems, and more particularly, to power systems having modules positioned beneath access flooring structures and the like.

2. Background Art

The use of computers, sophisticated telecommunications equipment and other electronic devices is continuing to rapidly increase in commercial, industrial and other office environments. As a result, the importance of efficiently supplying power throughout these environments is also increasing. In particular, the use of modular office systems, with movable workstations and interior walls, has led to electrical systems far different and more sophisticated than the conventional designs comprising single or double unit electrical receptacles mounted in stationary walls, with the receptacles energized from incoming power supplies with cables extending through wall interiors. Such conventional single or double unit receptacles, particularly when used with modular office systems, were often located a substantial distance from electrical devices to be energized and would cause unsightly and sometimes dangerous arrays and result in entanglements of the electrical cords connected to the devices. Thereafter, pluggable units having a number of receptacles and a common power source cord to be plugged into the conventional utility outlet started to be used. Again, however, such units result in unsightly and entangled arrays of electrical device cords.

With the growth of the use of electrical power and modular office systems, it became known to employ removable wall panels or the like (which defined the workstation areas), with the panels or other structures having a raceway area for accommodating electrical wiring and electrical junction blocks near the floor or otherwise near the locations to be energized. Typically, junction blocks were mounted within the raceway areas by attaching them with various types of structural arrangements. During the past two decades, a substantial number of issued patents have been directed to concepts associated with these raceways and means for mounting electrical receptacles within the raceways.

Although the concept of employing raceways and electrical receptacles within modular wall panels and the like presented a substantial advance in electrical power supply design, this type of design does not provide a complete solution for all office system arrangements. For example, such panels can be relatively expensive and require a substantial number of different types of electrical components. Further, the particular electrical components to be employed can be dependent on the specific office system design. For example, many of these electrical system arrangements require different components dependent upon whether outlets are to be used on one side of a removable panel or the other side. Still further, many of these systems include relatively complex and expensive components to interconnect electrical power among various wall panels.

In addition to the foregoing problems, these electrified panels do not provide a complete solution to efficiency and aesthetics of power supply design when a more conventional office system design employs stationary walls with more permanent and fully enclosed offices. On the other extreme, in completely open office or "bullpen" design arrangements, no walls, removable or otherwise, are employed and the electrical system designer is again left with significant design problems.

In view of all of the foregoing, electrical system designers are again considering the use of electrical receptacles and similar electrical devices beneath access flooring. Such flooring arrangements allow power and signal cables to be placed beneath the floor in positions which do not interfere with the placement of walls or furniture. Further, such arrangements do not require any walls whatsoever, as required with raceways and receptacles mounted within removable walls. With the use of access flooring, the power and signal cables, along with other appropriate electrical devices, can be moved as the modular offices or other office design arrangements are modified.

Floor mounted devices for providing electrical service have been known for several decades. Early devices typically employed power supply cables extending underneath permanent flooring and interconnected to junction boxes or the like. Electrical receptacles would be mounted by some means within the junction boxes and electrically connected to the receptacle outlets.

For example, Stas, U.S. Pat. No. 2,996,566 discloses a floor-type outlet box for use within concrete flooring. The outlet box includes a duplex receptacle positioned so that the receptacle outlets extend vertically upward slightly beneath the floor level. A cover plate is hingedly mounted to the box and capable of being sealed to provide a water-tight housing flush with the concrete floor. Another, still earlier, disclosure of a junction box having electrical outlets for use in concrete floors is set forth in Buchanan, U.S. Pat. No. 1,928,198. The Buchanan patent is primarily directed to an arrangement for adjusting the position of the outlet box after the concrete floor is poured so as to compensate for any undesired displacement.

Several of the known arrangements for providing electrical receptacles in floors include arrangements for selectively positioning the receptacles between exposed and concealed positions. For example, Press, U.S. Pat. No. 3,622,684 discloses a floor receptacle mounting unit having electrical receptacles which can be rotated to a position in which the receptacles are exposed above the level of the floor or, alternatively, rotated to positions in which the receptacles are concealed below the floor level. Myers, U.S. Pat. No. 3,433,886 discloses an electrical junction box to be mounted flush with a floor. The junction box adjustably mounts an electrical service or receptacle box which is recessable below the floor surface through the use of adjusting machine screws. Other floor mounted electrical junction boxes and receptacles are shown in the following references: Kelly, U.S. Pat. No. 3,395,243; Wiesmann, U.S. Pat. No. 2,738,892; Fuller, U.S. Pat. No. 3,975,074; Guerrero, U.S. Pat. No. 2,811,574; MacLeod, Jr., U.S. Pat. No. 3,131,512; and Dubreulio, U.S. Pat. No. 3,794,956.

With respect to the previously cited references, most of these references are directed to floor mounted electrical receptacles and junction boxes to be mounted in permanent flooring. However, with the increase in use of modular offices, and for various other design and structural reasons, the use of access flooring is becoming more widespread. Such access flooring also allows the positioning of junction boxes and incoming power and signal cables to be placed beneath the floor after or during the design of the office systems (modular or otherwise) to be employed within the commercial or industrial environment. Such access flooring also allows for power and signal cables to be placed beneath the floor in a position which will not necessarily interfere with the placement of walls or, for that matter, furniture placement following complete office design. In addition, the use of such access flooring allows for junction boxes, electrical outlet boxes, power and signal cables to be selectively moved as the office systems are rearranged.

In known systems for utilizing electrical power with access flooring, power and signal cables are interconnected between incoming power supplies and junction or electrical receptacle boxes referred to herein as access floor modules. Appropriate office equipment is directly connected to receptacle outlets within the access modules which are designed specifically for receiving the receptacle outlets.

An example of a known access floor module is disclosed in Brownlie et al., U.S. Pat. No. 5,122,069. With reference to the drawings and the numerals disclosed in the Brownlie et al. patent, FIGS. 1-4 illustrate an access flooring module to be mounted in an opening 4 provided in an access floor. The module 2 is movable between an open position (FIG. 3) and a closed position (FIG. 4). Recesses 24 are provided so as to receive electrical components such as power sockets 34 or signal sockets 36 shown in FIG. 1. Metal plates 25 (shown in FIG. 2) selectively provide electrical contact with electrical components to be utilized with the module 2. In an alternative embodiment of the Brownlie et al. patent, FIG. 12 depicts interconnection of high tension cables 240 and low tension cables 241 to the rear of an alternative module 200. The high tension cable 240 is secured through a hard wire bracket 209, with the low tension cable 241 secured through a data bracket 211. Cable ties 242 are utilized to secure the cables to the rear of the module.

Although the prior art shows a number of designs for floor-mounted boxes capable of mounting electrical receptacles, an important aspect of floor-mounted arrangements is the overall "system." The overall system includes all of the junction boxes, electrical receptacle boxes and outlets, and the requisite cabling, including the means for interconnection of cabling. For example, if the system requires cables of different types with respect to lengths, connectors, and other structural considerations, the system designer's job is more complex, since the designer must essentially have a final system design before ordering the requisite cabling. Although an inventory of various cables may be ordered and stored, such an inventory may be expensive, take up valuable storage space and involve components which are never used. Still further, if a voluminous inventory is not desired, the designer must have exact details as to positioning of electrical outlets, system dimensions and other layout information before undertaking the process of ordering the cabling.

Other design and assembly issues for these types of electrical systems relate to system components other than cabling. For example, such systems may utilize one type of component for a junction box, and another type of component for mounting electrical receptacles. Again, such a structure suffers from the same problems previously described with respect to requiring various types of cables for the overall system.

In addition to issues associated with cabling, junction boxes and receptacle mounting structures, the means for interconnecting system components is also important. For example, if the interconnection of cables to other cables, or to junction boxes and the like, requires hard-wired connections, problems arise with respect to both design and assembly. More specifically, assembling electrical components beneath a floor structure by means of screws and bolts is an arduous task, even for the most skilled electrician.

In view of all of the foregoing, it would be advantageous to provide an electrical access floor system with substantial interchangeability of components, reduction in the number and types of different components, and ease of interconnection of components and general assembly.

SUMMARY OF THE INVENTION

In accordance with the invention, an electrical system is provided which is adapted to be positioned under an access floor. The electrical system is further adapted for supplying electrical power from an interconnected power source to selectively interconnected electrical devices. The electrical system in accordance with the invention is advantageous in that it comprises a relatively few number of different types of components, allows for various types of electrical and communications outlets, facilitates rearrangement of the overall system configuration, and allows for ease of removable interconnection of system components. In this regard, certain components of the electrical system are substantially interchangeable with each other, including receptacles.

The electrical system includes a plurality of substantially identical electrical access floor modules selectively spaced under the access floor. The modules provide conveniently located electrical power locations for energizing the electrical devices. In addition, the system includes a plurality of junction blocks. Each of the junction blocks is located internally of a different one of the plurality of access floor modules. A plurality of cable assemblies are also provided, for electrically interconnecting the access floor modules to the power source and to each other.

A plurality of electrical receptacle blocks are also included within the system. Each block comprises at least one electrical receptacle, connectable to one or more of the electrical devices for supply electrical power thereto. Each of the receptacle blocks is further connectable to at least one of the junction blocks.

The electrical receptacle blocks include at least a first set of electrical blocks and a second set of electrical blocks. The first set of electrical blocks has a circuit configuration different from a circuit configuration of the second set of blocks. Each of the first set of electrical blocks and the second set of electrical blocks is electrically connectable to the junction blocks. The electrical receptacle blocks are interchangeable with each other, so as to provide capability of changing circuits available through the electrical receptacles, without modifying the junction blocks or cable assemblies.

Further in accordance with another aspect of the invention, the first set of electrical receptacle blocks is interchangeable with the second set of blocks, while the access floor modules are positioned in their working locations under the access floor. The first set of electrical receptacle blocks are interchangeable with the second set of electrical receptacle blocks, and are connectable to the junction blocks without requiring the use of any tools or other equipment.

The electrical system further includes cover means for providing covers to the access floor modules. The cover means include means for permitting extension of cables from the interior to the exterior of the access floor modules, while the cover means are in closed positions.

In accordance with the further aspect of the invention, the electrical receptacle blocks are interchangeable with each other, so as to provide the electrical system as a modular system, adapted to be sized and configured in a manner which does not require any substantial number of different types of electrical equipment. The system also includes releasable connection means associated with the junction blocks for releasably and electrically connecting the junction blocks to the cable assemblies. The junction blocks are interchangeable with each other, so as to permit installation of any of the junction blocks into any of the access floor modules. At least a subset of the plurality of cable assemblies are each identical with others of the subset, with the exception of length.

With respect to the cover means for providing covers to the plurality of access floor modules, the cover means can be manually rotated between open and closed positions, without requiring any tools or other equipment. Further, the cover means can include a plurality of covers, each being a double-in cover for providing manual rotation between open and closed positions and either of two opposing directions. The cover means and the plurality of access floor modules comprise means for providing manual rotation in two opposing directions, without requiring any reversal or other realignment of the covers, relative to the access floor modules.

Each combination of one of the access floor modules and an interconnected one of the junction blocks comprises means for receiving power through an interconnected one of the cable assemblies, and passing the power through to at least two additional interconnected cable assemblies. The combination of each of the floor modules and interconnected junction blocks comprises means for applying power from the power source onto an interconnected cable assembly, which is further directly interconnected to another one of the combinations of access floor modules and junction blocks.

The floor access modules include means for mechanically interconnecting one of the junction blocks to the module. The electrical system includes cover means for covering tops of the modules, and the cover means in the access floor modules comprise means in the form of openings, when the cover means are in closed positions, so as to provide means for extending cables or wires from interiors of the access floor modules to spatial areas above the access floor modules. The system also includes cover brackets positioned at upper locations of the modules, and including opposing pairs of hinge pins for hingedly receiving covers for the access floor modules. Also with respect to the cover means, the electrical system includes means for permitting each of the covers to be rotated to a first, open position where the cover will remain stationary in the absence of any external forces exerted on the cover.

The electrical system can include a subset of the junction blocks which comprise double sided junction blocks. These double sided junction blocks provide for electrical interconnection of the receptacle blocks on opposing sides of the junction blocks. Each of at least a subset of the junction blocks can also be of a length which provides for electrical interconnection of at least two of the receptacle blocks on at least one side of the junction blocks.

The junction blocks can be installed in corresponding ones of the access floor modules, with the junction block centered relative to the floor modules. The centering of the junction block provides for electrical interconnection of receptacle blocks on opposing sides of the junction blocks. Each of the junction blocks can include a pair of electrical connector sets on opposing ends of the blocks.

Still further, the cable assemblies can be adjustable in length. The electrical receptacle blocks can comprise duplex electrical receptacles. Still further, the electrical system can include voice/data or other communication ports. Means can be associated with at least one of the access floor modules for mechanically and releasably connecting at least one of the communication ports to the access module. The system can also include conventional communications element mounting brackets mechanically connectable to at least one of the access floor modules.

BRIEF DESCRIPTION OF THE DRAWING

The invention will now be described with reference to the drawing, in which:

FIG. 8 is a perspective view of the junction block portion of the junction block cable shown in FIG. 6, and further showing the releasable interconnection of the junction block to the access floor module component;

FIG. 9 is an elevation view of one side of the access floor module component to which the junction block of the junction block cable is releasably interconnected, and specifically showing the mounting bracket arrangement of the access floor module, with the junction block cable removed;

FIG. 10 is a side elevation view of the junction block of the junction block cable releasably interconnected to the access floor module component, through lines 10-10 of FIG. 8;

FIG. 11 is an underside view of the mounting bracket for the releasable interconnection of the junction block to the access floor module, shown through lines 11-11 of FIG. 9.

FIG. 13 is a sectional view of the junction block taken along lines 13-13 of FIG. 12;

FIG. 14 is a perspective view of an electrical receptacle block;

FIG. 15 is an end view of the block shown in FIG. 14;

DESCRIPTION OF THE PREFERRED EMBODIMENT

Figure 1:
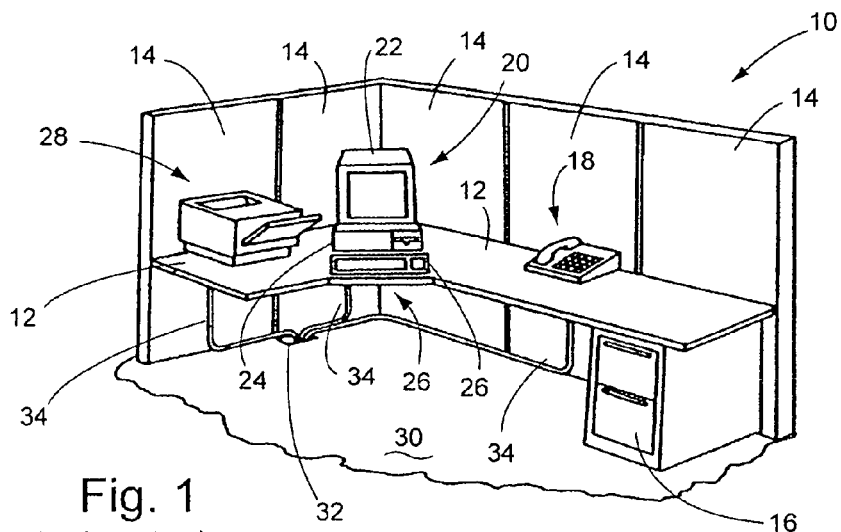
FIG. 1 is a partial, perspective view of a typical workstation employing an electrical access floor system for electrically interconnecting various equipment to an incoming power supply under an access floor.

The principles of the invention are disclosed, by way of example, in several embodiments directed to electrical access floor systems, is depicted in FIGS. 1-35. In particular, the preferred embodiment of an electrical access floor system in accordance with the invention as described herein comprises the system 500 primarily illustrated in FIGS. 16-35. The electrical access floor systems provide for readily accessible access floor modules having means for selectively mounting and positioning electrical receptacle outlets, communications outlets and similar devices. The floor access system also provides for facilitating interconnection of cables and receptacles without hard-wired interconnections. In addition, the electrical access floor system uses a relatively minimum number of different types of electrical components and readily provides component interchangeability and facilitates system reconfiguration.

Still further, an electrical system in accordance with the invention includes a cover arrangement for providing covers to access floor modules. The covers can be manually rotated between open and closed positions, without requiring any tools or other equipment. In addition, the covers can include double-hinged covers for providing manual rotation between open and closed positions in either of two opposing directions. This rotation can be provided without requiring any reversal or other realignment of the covers relative to the access floor modules.

In addition, combinations of the access floor modules and interconnected ones of certain junction blocks include arrangements for receiving power through and interconnected to one of the cable assemblies, and passing the power through to at least two additional cable assemblies. Other novel concepts of electrical systems in accordance with the invention will be made apparent through the description set forth in subsequent paragraphs herein.

The access floor systems as described in subsequent paragraphs herein are adapted for use in various types of office and other commercial and industrial environments. For example, such an office environment can include a workstation such as workstation 10 illustrated in FIG. 1. As shown therein, the workstation 10 can include a modular office arrangement comprising work surfaces 12 removably mounted by conventional means (not shown) to modular and moveable wall panels 14. The workstation 10 can also include conventional components such as storage drawers 16 and like equipment. In addition, the workstation 10 can include equipment requiring electrical interconnections, such as the telecommunications station 18 and personal computer 20, with the personal computer 20 comprising a display monitor 22, processor 24 and keyboard 26. In addition, other devices such as printer 28 may also be employed.

As previously described in the section entitled "Description of the Related Art," modular office panels such as panels 14 may often include electrical raceways for mounting electrical receptacles or the like (not shown) near the lower portions or in other areas of the panels 14. As an alternative, workstation 10 may also be employed in an office environment having access flooring such as access floor 30 illustrated in FIG. 1. The access floor 30 can include floor apertures such as floor aperture 32 opening to an area below the floor 30. Access floors such as floor 30 are well known in building and office system design. The floor aperture 32, as described subsequently herein, can provide access to electrical and communications outlets for energizing the various electrical equipment of the workstation 10. Interconnection to an electrical power source is provided by means of electrical and communications cords 34 also illustrated in FIG. 1. The cords 34 can be in the form of conventional insulated electrical wires carrying AC power to components such as the printer 28. The cords 34 may also comprise communication lines carrying voice or other data signals from and to equipment such as the telecommunications station 18 and personal computer 20.

Figure 2:
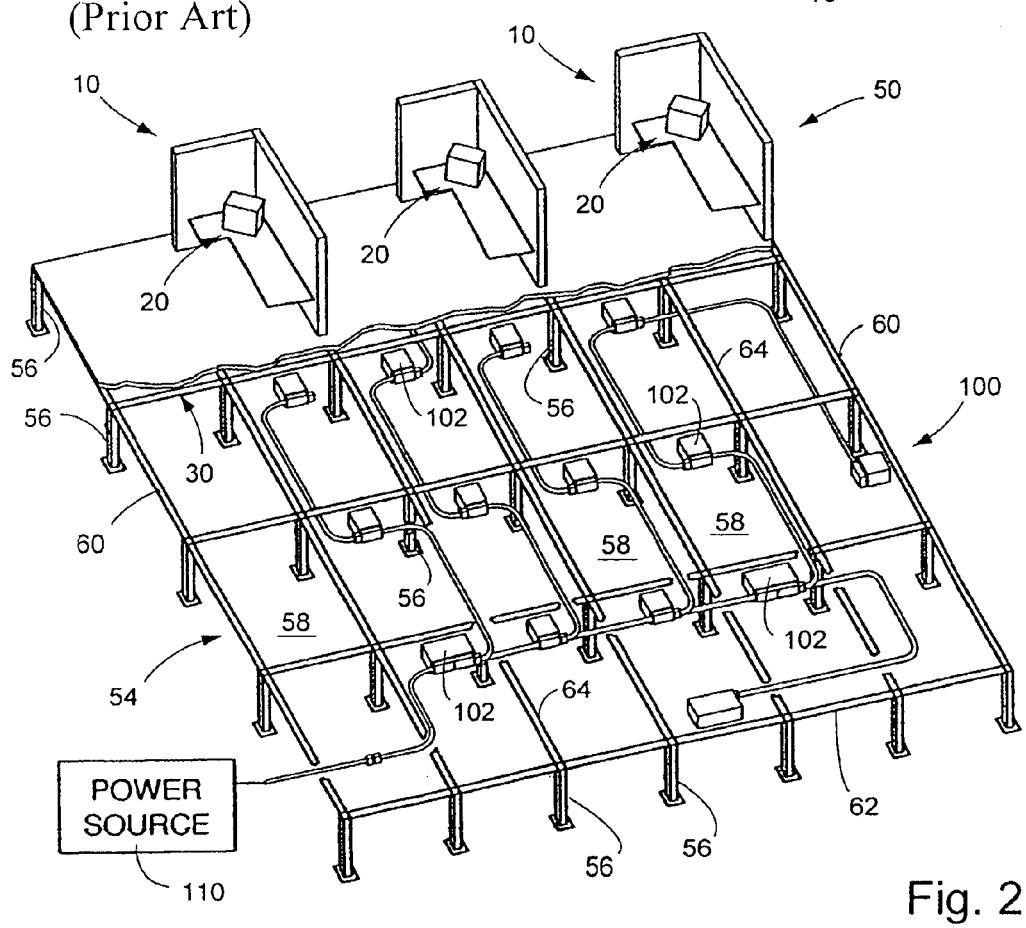
FIG. 2 is a perspective view of an under floor electrical system arrangement in accordance with the invention, showing a partially cut-away access flooring.

The workstation 10 with the access floor 30 can be employed within a modular office system, such as the system 50 illustrated in FIG. 2. As shown in FIG. 2, the office system 50 may comprise several of the workstations 10, in addition to other work areas (not shown) having more of an "open" environment such as conventional desks and the like. Although not expressly shown in FIG. 2, desks, as well as the workstations 10, could include electrical cords and communication lines, such as the cords and lines 34 shown in FIG. 1, extending from electrical equipment at the desks and workstations 10 through apertures (not shown in FIG. 2) extending through the access floor 30.

As further shown in FIG. 2, the access floor 30 can essentially comprise a "raised" floor structure. The raised access floor 30 can be mounted by any suitable means to a floor mounting system 54. The floor mounting system 54 can include vertical support posts 56 mounted in an upright orientation and secured by any suitable means to a permanent floor or base structure 58. The floor support system 54 can include opposing end braces 60. Mounted between the opposing end braces 60 are spaced apart longitudinal braces 62. The two opposing end braces 60 and the two longitudinal braces 62 at opposing far sides of the floor support system 54 essentially form a perimeter (in the case of the structure shown in FIG. 2, a rectangular perimeter) for the support system 54. Mounted perpendicular to the longitudinal braces 62 are spaced apart transverse braces 64. The braces 62 and 64 form square or rectangular sections of the access floor 30. In many of these types of raised access floor systems, the rectangular sections formed by the braces 62 and 64 are of a size so as to appropriately position and support a corresponding unitary section of the access floor 30.

It should be emphasized that the particular access floor 30 and the individual elements of the support system 54 do not form any of the principal concepts of the invention. Electrical access floor systems in accordance with the invention may be utilized with varying types of floor structures. However, systems in accordance with the invention are particularly well suited for access flooring systems having removable sections and the like.

Figure 3:
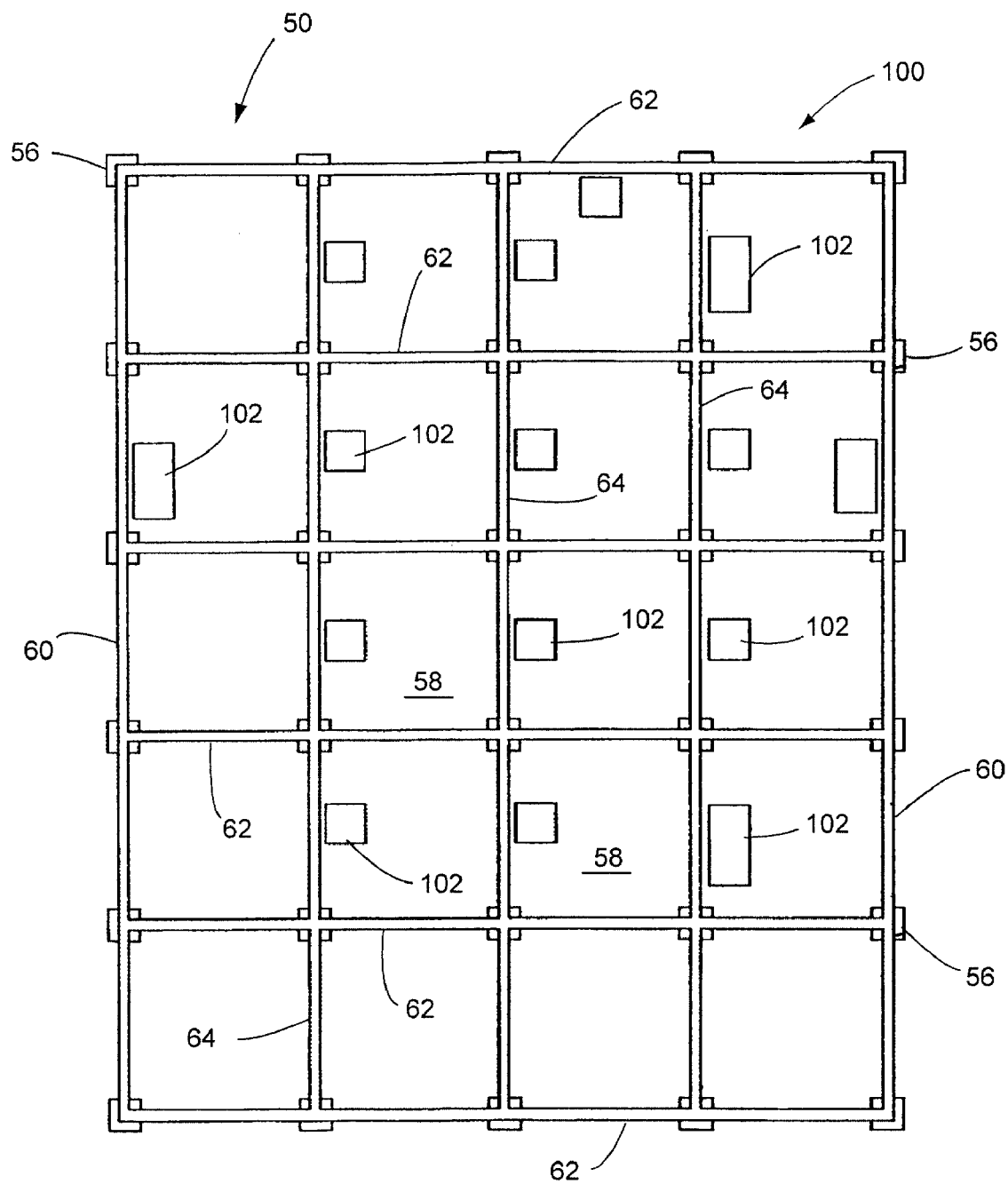
FIG. 3 is a plan view of the under floor area of FIG. 2 (with the floor almost completely cut-away except for supporting braces), showing relative positioning of electrical access floor module components.

The general structure of one embodiment of an electrical access floor system will now be described with reference to FIGS. 2, 3 and 4. As shown in these drawings, an electrical floor access system 100 is employed under the access floor 30 in a manner so as to be accessible to the electrical equipment of the office system 50. A primary component of the electrical system 100 comprises an access floor module 102. The electrical system 100 comprises a number of access floor modules 102 positioned beneath the access floor 30 and mounted by any suitable means (not shown) above the permanent flooring 58.

As described in subsequent paragraphs herein, the access floor modules 102 comprise structures to which electrical receptacles and communication outlets may be mounted. That is, the access floor modules 102 essentially comprise a basic "building block" of the electrical system 100. When the general locations of the workstations 10, desks and other components of the office system 50 are determined by the office system designer, a general layout can be provided as shown in FIG. 3 for the access floor modules 102. That is, it would typically be preferable to have at least one access floor module 102 adjacent each of the workstations 10 and desks 52. Accordingly, FIG. 3 essentially illustrates a "starting point" for the overall configuration of the electrical system 100 after the general layout of the office system 50 has been determined.

After the appropriate positioning of the access floor modules 102 has been determined, an appropriate and efficient cabling interconnection can be determined. FIG. 4 illustrates a relatively simplified and somewhat symbolic block diagram format for the access floor modules 102 and the appropriate cabling interconnections. Details of the access floor modules 102 and the cabling arrangements will be set forth subsequently herein. The purpose of FIGS. 2-4 is to provide a general overall view of the system concepts associated with the electrical system 100.

In addition to the access floor modules 102, a basic element of the electrical system 100 comprises the junction block cable 104. As will be described in greater detail herein, each of these junction block cables 104 includes a connector 106 permanently connected with the cable at one terminating end thereof. The connector 106 is capable of direct and releasable electrical interconnection to another junction block cable 104. As described in subsequent paragraphs herein, the electrical interconnection between junction block cables 104 can be made without requiring any tools or "hard" wiring.

At the opposing ends of each of the junction block cables 104 is a permanently connected junction block 108. As with the connectors 106, details of an exemplary embodiment of the junction block 108 will be described in subsequent paragraphs herein. The junction blocks 108 can be removably mounted to a selected access floor module 102. The junction blocks 108 serve to provide electrical interconnection and mounting for electrical receptacles and similar devices for direct interconnection with the electrical cords and communication lines 34 previously described with respect to FIG. 1. Of particular advantage, and as also further described in subsequent paragraphs herein, each of the junction blocks 108 includes an electrical structure which is capable of electrical interconnection to a connector 106 of a junction block 108 of another junction block cable 104.

Figure 4:
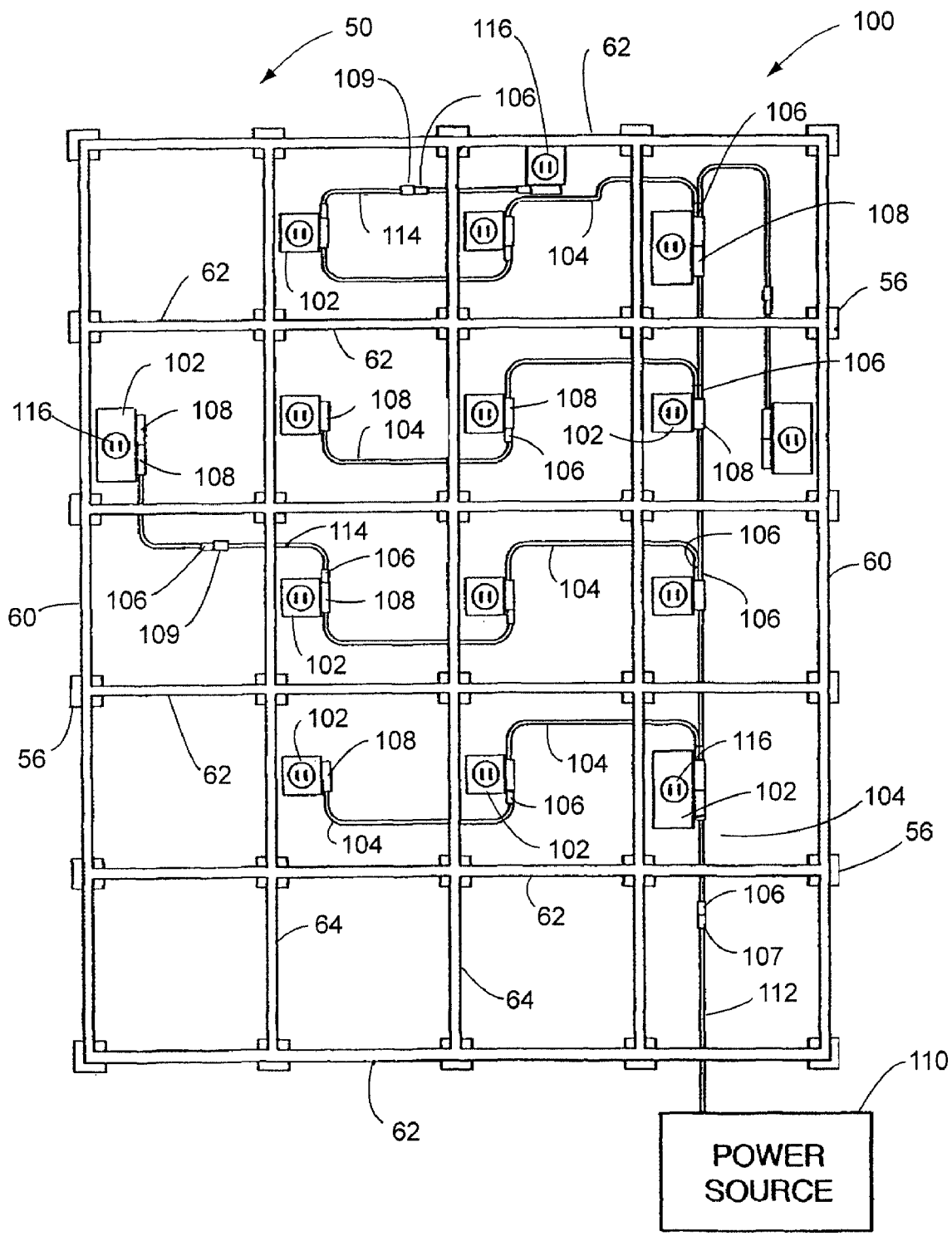
FIG. 4 is a plan view showing an exemplary embodiment of cabling interconnections for the access floor modules illustrated in FIG. 3.

FIG. 4 also illustrates, in symbolic form, a power supply source 110. The source 110 can comprise an input location for conventional utility power. To interconnect the electrical system 100 to the power supply source 110, a power input cable 112 as shown in FIG. 4 can be utilized. The cable 112 can include an electrical connector 107 capable of electrically mating with the connector 106 of one of the junction block cables 104. Accordingly, the cable 112 can be interconnected to the power supply source 110 and one of the junction block cables 104 through connectors 106 and 107. In this manner, external utility power can be initially supplied to the electrical system 100.

In accordance with the foregoing, the electrical system 100 can provide a number of locations for supplying electrical power to the workstations 10 and desks of the office system 50 shown in FIG. 1. Such power can be provided with a relatively minimum number of different types of components, namely the access floor modules 102 and junction block cables 104. The system 100 illustrated in FIG. 4 will again be referred to after a more detailed description is provided of the access floor modules 102 and junction block cables 104.

FIG. 4 also illustrates one other type of cable-connector element. More specifically, and as shown with respect to the majority of the access floor modules 102 in FIG. 4, interconnections can be made from one access floor module 102 to another access floor module 102 through the use of a single junction block cable 104. However, in certain instances, the distance between relatively adjacent access floor modules 102 may be longer than a conventional and uniform length of a junction block cable 104. In these situations, a second type of cable, referred to herein as an extension cable and shown as extension cables 114 in FIG. 4, may be employed. The extension cables 114 differ from the junction block cables 104 in that the extension cables 114 do not have any junction blocks 108 at their terminating ends. Instead, the extension cables 114 comprise a connector 106 electrically interconnected to one of the terminating ends of the cable 114, while a different electrical connector 109 is connected to the other of the terminating ends of the cable 114. Each of the electrical connectors 109 is adapted to interconnect to one of the connectors 106. For example, if the connector 106 is a male connector, the connector 109 will be a female connector. In the particular embodiment illustrated in FIG. 4, the electrical connectors 109 have a configuration which permits only one of the connectors 106 to be interconnected to any given connector 109. In contrast, and as described with respect to FIG. 5 in subsequent paragraphs herein, the electrical connectors 109 may comprise multiple connector terminals, capable of electrical interconnection to more than one other connector.

FIG. 4 also illustrates, in symbolic and block diagram format, the location of electrical receptacle outlets shown as outlets 116 in FIG. 4. The outlets 116 may be in the form of conventional single or duplex electrical receptacles, or may also take the form of other types of communication interconnections. As will be described in subsequent paragraphs herein, the outlets 116 are actually mounted within the junction blocks 108 in a manner so as to facilitate assembly and disassembly.

Figure 5:
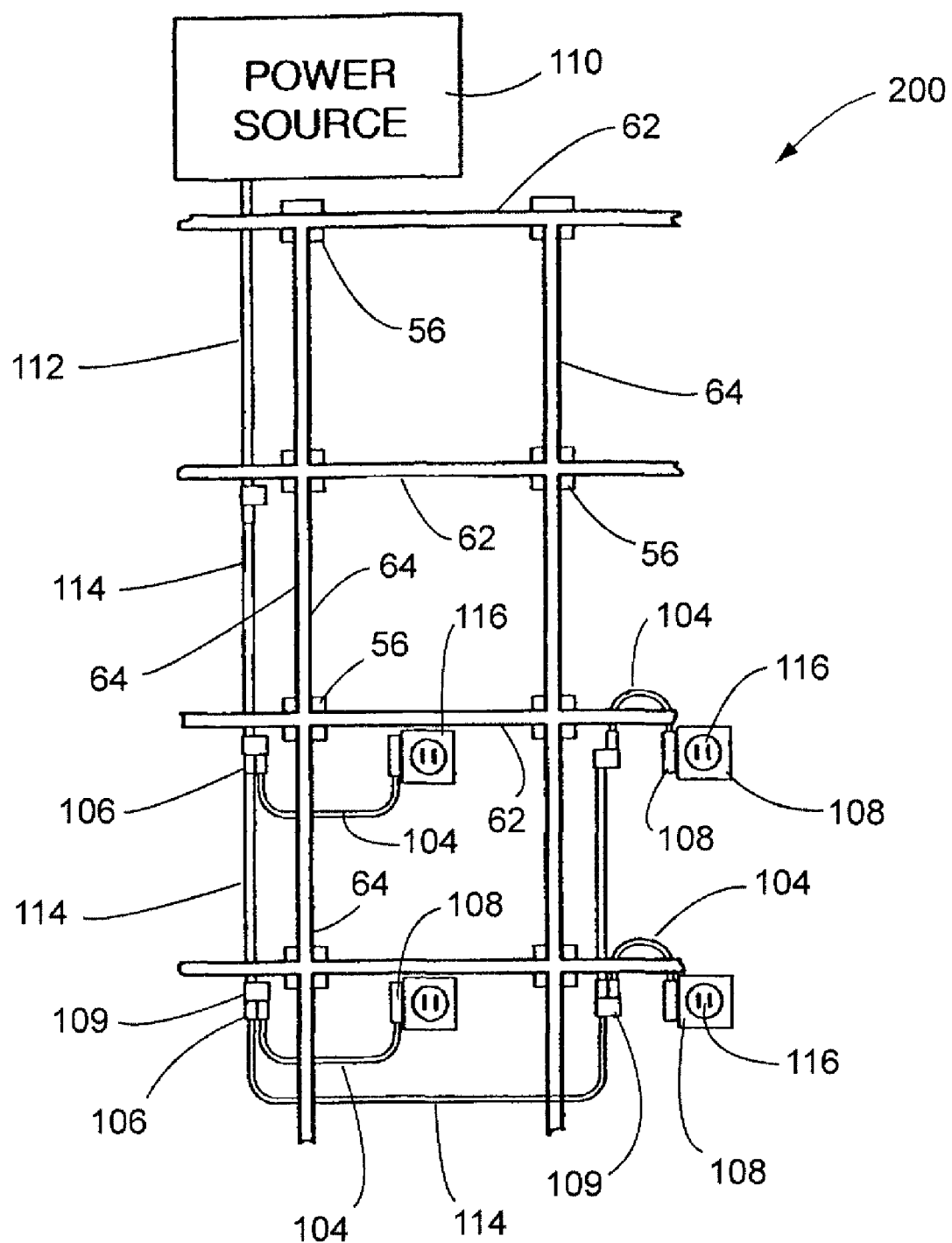
FIG. 5 is a plan view of an under floor area (with the floor cut-away except for supporting braces) of an alternative embodiment of a configuration of access floor modules and cabling interconnections therefore in accordance with the invention.

FIG. 5 illustrates an alternative embodiment of an electrical access floor system in accordance with the invention. In this particular embodiment, shown as electrical system 200 in FIG. 5, a somewhat different arrangement of access floor modules 102 is provided, relative to the system 100 illustrated in FIG. 4. As with the electrical system 100 illustrated in FIG. 4, the electrical system 200 also includes access floor modules 102, with the use of junction block cables 104. However, in the particular arrangement shown as electrical system 200 in FIG. 5, the extension cables 114 briefly introduced with respect to FIG. 4 are used fairly extensively. As previously briefly described with respect to FIG. 4, each of the extension cables 114 includes an electrical connector 106 at one terminating end thereof. The electrical connector 106 associated with extension cable 114 corresponds to the electrical connectors 106 previously described with respect to the junction block cables 104. However, unlike the junction block cables 104, the other terminating end of the extension cables 114 may include a double connector 109. The double connectors 109 have the capability of interconnecting one or two other cable elements through connectors corresponding to connectors 106 previously described with respect to the junction block cables 104 and extension cables 114. Accordingly, each extension cable 114 has the capability of interconnection to one or two other extension cables 114 or junction block cables 104, or a combination of the two. After describing in greater detail individual components of the electrical access floor systems 100 and 200, the structural interconnection configurations of the electrical systems 100 and 200 will again be referenced.

Figure 6:
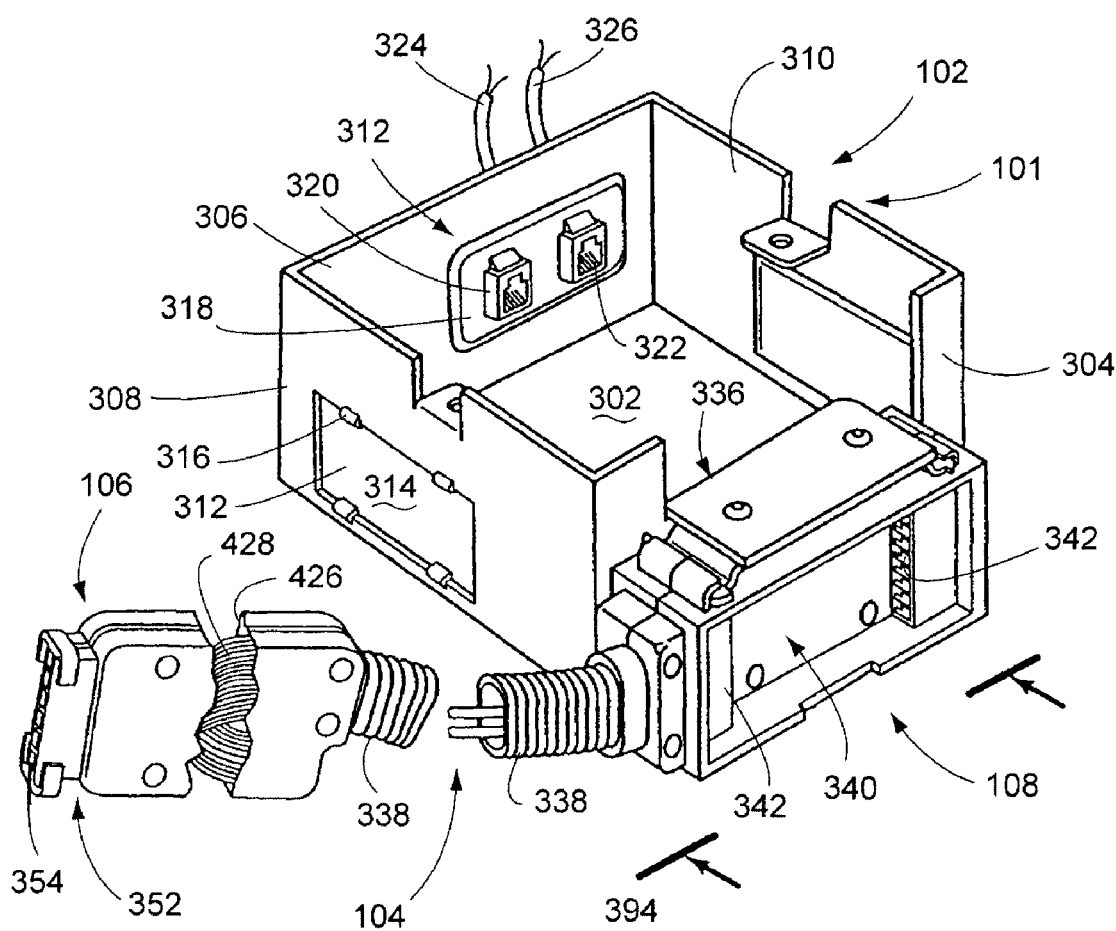
FIG. 6 is a perspective view of an access floor module, with the access module having an outlet receptacle pair (with the outlet receptacle pair in the junction block partially hidden from view), a voice/data communications outlet pair and a junction block cable releasably connected to the access module.
Figure 7:
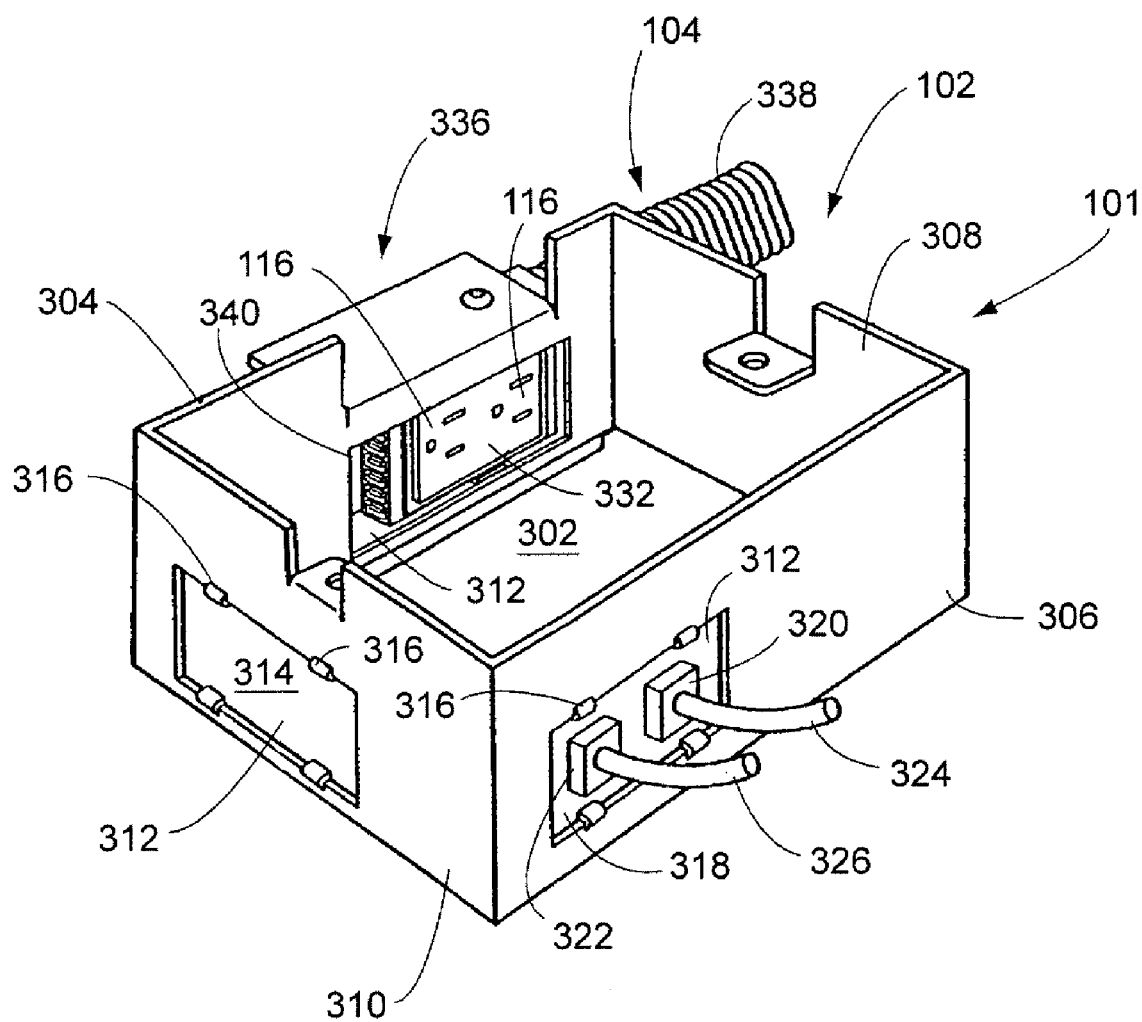
FIG. 7 is another perspective view of the access floor module shown in FIG. 6, with the view essentially opposing the view of FIG. 6, and specifically showing the outlet receptacle pair in the rear portion of the access floor module.

FIGS. 6 and 7 illustrate perspective views of the access floor module 102 with an attached junction block cable 104. The access floor module 102 comprises an access floor component 101 which is essentially formed in a rectangular, box-like structure with an open top portion. The access floor component 101 comprises a bottom floor portion 302, along with an integrally connected front portion 304 and rear portion 306. The front portion 304 and rear portion 306 are each positioned vertically upright and perpendicular to the floor portion 302. The access floor module 102 also includes a first end portion 308 and a second opposing end portion 310. Each of the end portions 308, 310 is also vertically upright and extends perpendicular to the floor portion 302. In accordance with the foregoing, the access module 102 forms the access module component 101 in the rectangular, box-like structure.

Positioned in each of the front and rear portions, 304, 306 and end portions 308, 310 is a rectangular aperture 312 positioned as desired for purposes of providing mounting and electrical access positions as described in subsequent paragraphs herein. In the particular embodiment of the access floor module 102 as shown in FIGS. 6 and 7, the rectangular apertures 312 in the first end portion 308 and second end portion 310 are concealed by covers 314. The covers 314 are snapped or otherwise secured into the rectangular apertures 312 by means of bendable fittings 316. When the rectangular apertures 312 with the covers 314 are to be utilized for electrical components, the fittings 316 can be bent or otherwise disconnected from the interconnected potions of the access module 102, so as to remove the covers 314 and expose the apertures 312.

As further shown in FIGS. 6 and 7, for purposes of interconnection of telecommunications facilities or the like, the rectangular aperture 312 in the rear portion 306 can be fitted with a conventional communications element mounting bracket 318. In general, the mounting bracket 318 can be employed to mount communications connectors such as the voice communications connector 320 and the data communications connector 322. The communications connectors 320, 322 can be connected to corresponding voice communications line 324 and data communications line 326, respectively. The communications lines 324, 326 are conventional in nature and can be connected to external communications facilities, such as incoming telephone lines and the like. Internally, with the floor access module 102 appropriately located beneath communications equipment within the office system, communications lines, such as the lines 34 illustrated in FIGS. 1 and 2, can be dropped through the floor 30 and interconnected to the appropriate voice communications connector 320 and data communications connector 322 internal to the structure of the floor access module 102. For simplicity of illustration, these communication lines running from the appropriate office equipment to the communications connectors 320, 322 are not illustrated in FIGS. 6 and 7.

In addition to the access floor module 102 illustrated in FIGS. 6 and 7, FIGS. 6 and 7 also illustrate a junction block cable 104 interconnected with the access floor module 102. The junction block cable 104 includes a junction block 108. Electrically interconnected to the junction block 108 is an electrical receptacle block 332. The electrical receptacle block 332 is illustrated only in FIG. 7 of the drawings of FIGS. 6 and 7. As shown specifically in FIG. 7, the electrical receptacle block 332 includes a pair of receptacle outlets 116 conventional in design and structure. The electrical receptacle block 332 is coupled to the junction block 108, and the junction block 108 is releasably mounted to the access floor module 102, in a manner such that the receptacle outlets 116 face inwardly into the interior of the access floor module 102.

The junction block 108 is releasably mounted to the access floor module 102 by means of a mounting assembly 336. Details of the junction block 108, electrical receptacle block 332 and mounting assembly 336 will be described in subsequent paragraphs herein with respect to more detailed illustrations.

The junction block cable 104 also includes an adjustable cable or conduit section 338 electrically connected to one end of the junction block 108. The junction block 108, as will be apparent from the description of additional illustrations in subsequent paragraphs herein, is double sided and includes, on each side, an opening 340 (only one of which is shown in FIGS. 6 and 7). Positioned in the opening 340 is a set of connectors 342 which are adapted to be interconnected to corresponding connectors of one of the electrical receptacle blocks 332. The particular opening 340 shown in FIG. 6, which extends external from the interior of the access floor module 102, is illustrated without any corresponding electrical receptacle block 332. The interconnection of the electrical receptacle blocks 332 with the connectors 342 will be described in greater detail with respect to additional illustrations in subsequent paragraphs herein.

The adjustable cable or conduit section 338 is connected at its end, opposing the end connected to the junction block 108, to a male connector block 106. The male connector block 106 is illustrated in FIG. 6, but not in FIG. 7. The male connector block 106 includes, at its terminating end, a male connector 352 which is provided with a plurality of male connector terminals 354. The male connector block 106 is adapted to be interconnected to appropriate energy sources so as to provide electrical power to the electrical receptacle block 332 through the junction block 108 and adjustable cable or conduit section 338. The male connector block 106 will be described in greater detail in subsequent paragraphs herein with respect to further illustrations. In particular, the male connector block 106 is adapted to be interconnected directly to an incoming power feed cable, such as the cable 112 illustrated in FIG. 4. In this manner, power is provided directly from the power feed cable 112 to the particular electrical receptacle block 332 associated with the corresponding junction block 108. In addition, the male connector block 106 is also adapted, as described in subsequent paragraphs herein, to be electrically and releasably mechanically connected directly to a junction block 108 associated with another junction block cable 104 interconnected with a different access floor module 102. This type of interconnection is also shown in the particular access floor system of FIG. 4. Still further, the male connector block 106 can also be interconnected to a female connector block of an extension cable, such as the extension cables 114 also illustrated in FIG. 5.

As earlier described, with respect to FIGS. 6 and 7, the access floor module 102 can include a mounting assembly 336, with respect to each of the junction block cables 104 to be interconnected to the access floor module 102. The mounting assembly 336 shown in FIG. 6 with respect to the embodiment of the access floor module 102 illustrated therein is further illustrated in FIGS. 8-11. FIG. 8 illustrates a perspective view of the mounting assembly 336, with an interconnected junction block 108. Correspondingly, FIG. 10, a sectional view, partially shows the mounting assembly 336 with the junction block 108. FIG. 9, for purposes of illustration, illustrates a front, sectional view of a mounting bracket 360 of the mounting assembly 336, with the junction block 108 removed.

With reference to FIGS. 8-11, the mounting assembly 336 provides attachment of the junction block 108 to the mounting bracket 360 by means of L-shaped mounting lugs 362 and 364 engaging corresponding L-shaped support brackets 366 and 368, respectively. The support brackets are integral with or otherwise connected to a horizontal member 370 which extends across the top of and between the L-shaped support brackets 366 and 368.

The horizontal member 370 is connected below and to a horizontal supporting tab 372. The supporting tab 372 is rectangular in structure and formed as an integral piece cut and bent from the front portion 304 illustrated in FIG. 6. The supporting tab 372 is bent at a right angle relative to the remaining part of the front portion 304, and includes a pair of apertures (not specifically shown in the drawings) through which a pair of rivets 374 or other appropriate connecting means are received. The rivets 374 extend through apertures 376 disposed in the horizontal member 370. In this manner, the horizontal member 370, with integrally connected L-shaped support brackets 366 and 368, is secured in an abutting relationship immediately below the horizontal supporting tab 372.

With reference to FIGS. 8 and 10, the junction block 108 is illustrated as a "single-sided" junction block, in that it only includes one recessed opening for an electrical receptacle. In contrast, the junction block 108 illustrated in FIG. 6 comprises a configuration of a junction block 108 which is "double-sided." That is, with the junction block 108 shown in FIG. 6, electrical receptacle blocks can be incorporated on two opposing sides of the junction block 108. More specifically, again with respect to FIGS. 8 and 10, the junction block 108 comprises a housing having a lower wall 380, upper wall 382 and middle walls 384 which serve to provide a spatial area 386. The spatial area 386 is also formed by a left side wall and a right side wall 390. As described in subsequent paragraphs herein with respect to further illustrations of the drawing, the spatial area 386 shown in FIG. 10 may be used to accommodate an electrical receptacle block, such as the electrical receptacle block 332 illustrated in FIG. 7. Such an electrical receptacle block is energized through interconnection with connectors positioned within the spatial area 386. The connectors and the interconnection of an electrical receptacle block 332 will be described in greater detail in subsequent paragraphs herein.

In addition to the connectors 342, the junction block 108 also includes a female connector block 392 extending outwardly from the right side wall 390. The female connector block 392, and the use thereof, is described in subsequent paragraphs herein with respect to further illustrations of the drawing. In particular, the female connector block is adapted to be electrically interconnected to a male connector, such as the male connector 352 illustrated in FIG. 6.

Extending outwardly and externally from the left side of block 108 is the adjustable cable or conduit section 338 interconnected in an electrical manner to the junction block 108 through the cable connector block 394. The cable connector block 394 and the adjustable cable or conduit section 338 are electrically interconnected to the connectors 342 (FIG. 13) and the female connector block 392 as described in subsequent paragraphs herein. The junction block 108 is maintained in a stationary and releasably secured position relative to the L-shaped support bracket 366 and L-shaped support bracket 368 by engagement of a retaining tab 396. As shown in FIGS. 9 and 11, the retaining tab 396 is preferably integral with the horizontal member 370 and comprises a tab which extends within a rectangular aperture formed in the central portion of the horizontal member 370.

The retaining tab 396 extending from the horizontal member 370 is adapted to engage a latching device 400 which is disposed between the mounting lugs 362, 364 extending upwardly from the upper wall 382 of the junction block 108. The latching device 400 comprises an interlocking latch member 402. The interlocking latch member 402 is provided with an elongated member such as tongue 406 as primarily shown in FIG. 10. The interlocking latch members 402, 404 are integrally formed on the top of the upper wall 382 of the junction block 108, and may be constructed of a resilient plastic material such as polycarbonate which provides a restoring force on the interlocking latch member 402. A lip 410 is at the end of the interlocking member 402 for engaging the retaining tab 396. The latching device 400 may be disengaged from the retaining tab 396 by depressing the interlocking latch member 402. When the latch member 402 is depressed, the catch portion 412 (FIG. 10) of the latch member 402 will move below the retaining tap 396. In this manner, the retaining tap 396 is disengaged from the lip 410 of the latch member 402. The junction block 108 may then be removed from the L-shaped supporting brackets 366 and 368 by pulling the junction block 108 outwardly from the tab 372. Specifically, this outward movement of the junction block 108 will cause the attachment lugs 362 and 364 to be disengaged from the L-shaped supporting brackets 366 and 368. Similarly, the junction block 108 may be installed and releasably interconnected with the access module 102 by slidingly engaging the attachment lugs 362 and 364 with the L-shaped support brackets 366 and 368. The sliding motion on the L-shaped support brackets 366 and 368 will result in engagement of the latching device 400 with the retaining tab 396, causing the interlocking latch members 402 to be depressed until the retaining tab 396 is captured by the lip 410. At that point, the restoring force imparted to the latching device 400 due to the resiliency of the interlocking latch member 402 causes engagement of the lip 410 with the retaining tab 396, thereby placing the junction block 108 in a releasably locked position relative to the access module 102.

FIG. 10 specifically illustrates a cross-sectional view along lines 10-10 of FIG. 8. As illustrated in FIG. 10, the open area or spatial area 386 is formed by the upper wall 382, lower wall 380 and back wall 384. This open area 386 on one side of the junction block 108 is adapted to receive an electrical receptacle block, such as the receptacle block 332 shown in FIG. 7. As shown in FIG. 10, the retaining tab 396 is captured by the lip 410 of the interlocking latch member 402, when the junction block 108 is coupled to the access module 102. As earlier described, to remove the junction block 108, the interlocking latch member is depressed (by any suitable means), so that the portion 412 is moved below the lower part of the retaining tab 396. In this configuration, the junction block 108 can be removed from the access floor module 102. As earlier described, the interlocking latch member 402 may be formed integral with the upper wall 382 in a suitable manner. With this configuration, and as shown in FIG. 10, the latch member 402 is integrally connected with the upper wall 382 by a vertical hinge section 416. The vertical hinge section 416 is preferably formed a resilient plastic material so as to provide a restoring spring force for the latch member 402, when the latch member 402 is depressed and forced toward the upper wall 382.

With further reference to FIGS. 8 and 10, the junction block 108 not only includes the back wall 384 but also an exterior wall 387. The spatial area between the exterior wall and the back wall 384 provides room for wires, cables or other electrical elements for carrying and transmitting electrical power. Such cables are illustrated as cables 389 in FIG. 10.

In accordance with the forgoing, the junction block 108 and associated junction block cable 104 may be releasably secured to a floor access module component 101 for purposes of providing electrical power in an appropriate position in the floor access layout. Concepts associated with mounting assemblies for electrical junction block housings are disclosed in the inventor's own U.S. Pat. No. 4,993,576 issued Feb. 19, 1991. The teachings of U.S. Pat. No. 4,993,576 are hereby incorporated by reference herein.

Figure 12:
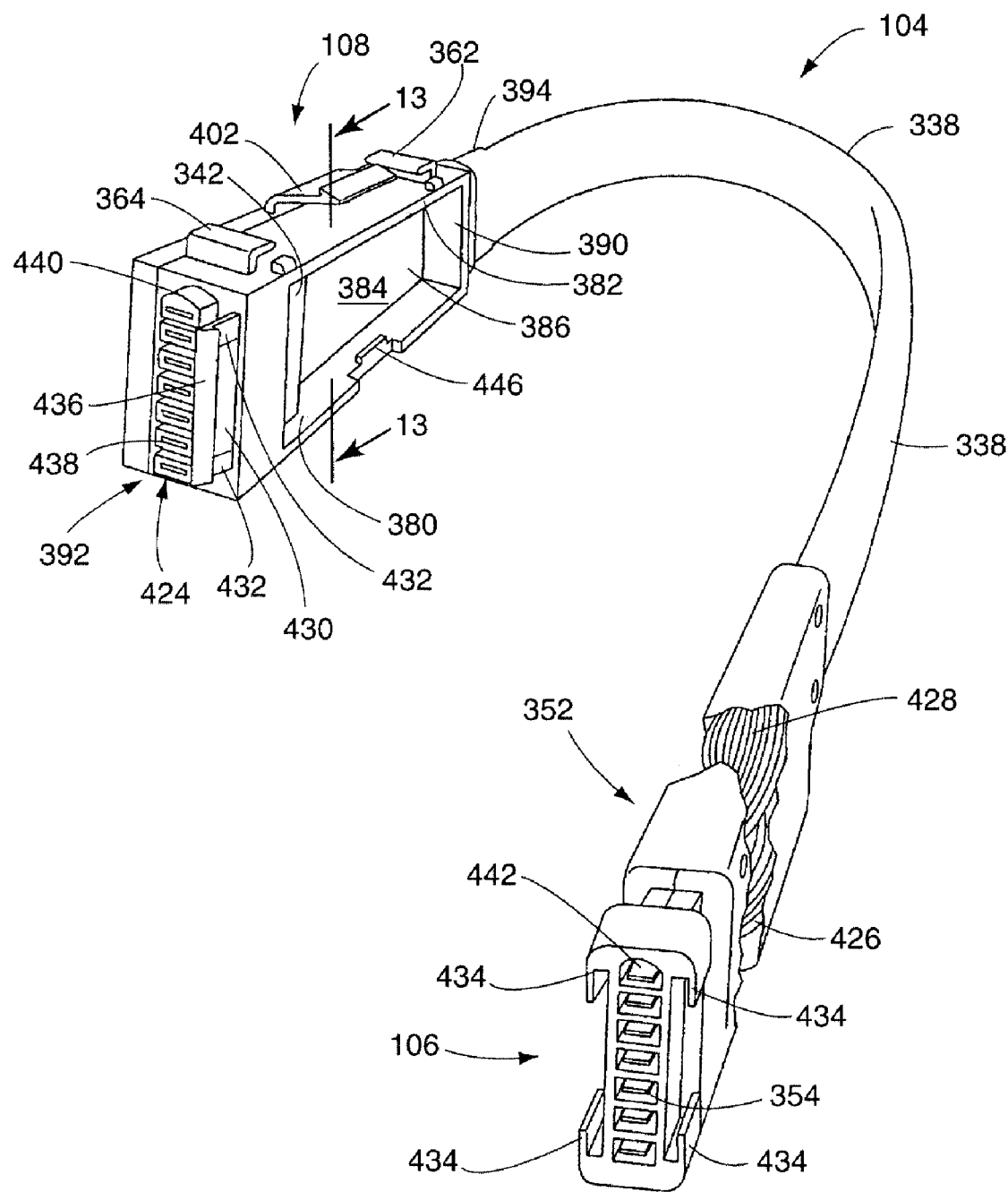
FIG. 12 is a perspective view of a junction block having a female connector pair interconnected through an adjustable cable or conduit section to a male connector.

Additional detail regarding the junction block cables 104 is illustrated in the enlarged perspective view of the one of the junction block cables 104 as shown in FIG. 12. As earlier described with respect to FIGS. 6-11, the junction block cable 104 includes a junction block 108, adjustable cable or conduit section 338 and male connector block 106. With respect specifically to the junction block 108, the block 108, as also previously described, includes a lower wall 380, upper wall 382 and back wall 384 which form an open spatial area 386 on one side of the junction block 108. In addition, as also described with respect specifically to FIGS. 8-11, the block 108 includes a female connector block 392 extending outwardly from one end of the general housing structure of the block 108. Extending outwardly from the other end of the junction 108 is a cable connector block 394 which, in turn, is interconnected to the cable of conduit section 338. As further described with respect to FIGS. 8-11 for purposes of releasably securing junction block 108 to a floor access module 102, L-shaped mounting lugs 362 and 364 are integrally mounted on the top of the upper wall 382. Also mounted on the top of the upper wall 382 is interlocking latch member 402.

As shown primarily in FIG. 13, which comprises a sectional view through section lines 13-13 of FIG. 12, the junction block 108 comprises a set of female receptacle connectors 342, with the connectors 342 being located in the open spatial area 386 on one side of the junction block 108. Electrical outlet receptacle blocks, such as the electrical receptacle block 332 previously described with respect to FIG. 7 and illustrated in greater detail in further drawings, are adapted to engage the female receptacle connectors 342. In this manner, each of the junction blocks 108 is adapted to support an electrical outlet receptacle block 332, on one side of the junction block 108.

As previously described, the junction block 108 further comprises a female connector block 392 extending outwardly from the junction block 108 adjacent the female receptacle connectors 342. The female connector block 392 comprises a female connector set 424. The female connector set 424 is essentially positioned in a straight line relationship with the female receptacle connectors 342. As will be described in subsequent paragraphs herein, the female connector block 392 is adapted to electrically interconnect the corresponding junction block cable assembly 104 to another of the junction block cable assemblies 104.

In addition to the female connector block 392, the junction block cable assembly 104, as previously described herein, comprises the male or end connector block 106. The male or end connector block 106 comprises a male connector 352 having a series of male connector terminals 354 positioned at the terminating end thereof. The male or end connector block 106 is connected to the junction block 108 by means of the adjustable cable or conduit section 338.

Electrical power is transmitted through the junction block cable assembly 104 by means of electrical wires disposed in the adjustable cable or conduit section 338, with the wires terminating at the male connector terminals 354 of the male connector 352. Correspondingly, these wires are further connected to the female receptacle connectors 342 located on the junction blocks 108. The female receptacle connectors 342 are further electrically connected to the female connector set 424 of the female connector block 392. In this manner, electrical power may be transmitted from external connections to the male connector terminals 354 or female connector set 424 to the female receptacle connectors 342.

For purposes of accommodating distance requirements between and among access floor modules 102, the cable or conduit section 338 may be adjustable and comprise an expandable flexible conduit. For purposes of providing such adjustability, the male or end connector block 106 may be provided with an inner spatial area 426, as shown in a partially broken-away view in FIGS. 6 and 12. The inner spatial area 426 is provided for storage of excess length of electrical wiring 428 in a coiled or other similar configuration. The excess length of electrical wiring 428 may be withdrawn with the adjustable conduit section 338 and expanded to an extended length. This type of an arrangement is similar to that disclosed in my earlier patent, U.S. Pat. No. 5,096,434, dated Mar. 17, 1992 and entitled ELECTRICAL INTERCONNECTION ASSEMBLY, and further disclosed in my still earlier patent, U.S. Pat. No. 4,579,403, dated Apr. 1, 1986 and entitled ELECTRICAL JUNCTION ASSEMBLY WITH ADJUSTABLE CONNECTORS.

The cable or conduit section 338 is preferably a flexible conduit which may be bent to accommodate a connection to others of the junction block cable assemblies 104 and access floor modules 102, rather than merely in straight line connections. Of primary importance, the male connector terminals 354 of a male or end connector block 106 of a particular junction block cable assembly 104 are electrically connectable to a female connector set 424 of a junction block 108 as associated with another of the junction block cable assemblies 104. In this manner, electrical interconnection of access floor modules 102 located at various positions under the floor illustrated in FIGS. 1 and 2 may be readily electrically interconnected. With the particular female connector block 392 of each junction block 108, it is possible to electrically interconnect other junction block cable assemblies 104 through the male connectors 352 of other cable assemblies 104.

Referring again to FIG. 12, the female connector set 424 of the female connector block 392 is provided with a side flange 430 having upper and lower recessed areas 432. The upper and lower recessed areas 432 are adapted to assist in providing engagement with flanges 434 of one of the male or end connector blocks 106 associated with another of the junction block cable assemblies 104. In this manner, a releasable locking arrangement is provided between a female connector set 424 and the male connector terminals 354. The side flanges 430 are preferably made of a resilient plastic material and formed integral with the housing of the junction block 108 to which they are associated. Preferably, the side flanges 430 are also provided with an outwardly extending inclined end surface 436. When the surfaces 436 are engaged by flanges, such as the flanges 434 of the male connector 352 on the male or end connector block 106 of another junction block cable assembly 104, the flanges 430 will be deflected inward, allowing the flanges 434 of the male connector 352 to engage the recesses 432 so as to provide a locking engagement of the male and the female connectors. Preferably, the female connector set 424 is provided with a plurality of female connector terminals 438 and a key lug 440. Correspondingly, the male connector 352, as previously described herein, is provided with a plurality of male connector terminals 354 and an opening 442 for receiving the key lug 440.

The electrical outlet receptacle block 332 is illustrated in perspective and side elevation views in FIGS. 14 and 15, respectively. In the particular embodiment of a receptacle block in accordance with the invention as set forth in FIGS. 14 and 15, block 332 is provided with male connectors 444 at both ends. Although not of an absolute necessity, providing male connectors 444 at both ends of the receptacle block 332 permits the receptacle 332 to be utilized with a junction block 108 having its female receptacle connectors 342 mounted on either of the two opposing sides of a spatial area 386. Also, if a junction block 108 was utilized which was a "double-sided" junction block (having a spatial area 386 on both sides of the junction block and two sets of female receptacle connectors 342, one of each set being located in a different one of the spatial areas 386), the receptacle block 332 can then be utilized in either of the two opposing spatial areas 386. In any event, it is apparent that numerous configurations could be utilized for the male connectors 444 and the female receptacle connectors 342 associated with junction blocks 108.

As shown in FIG. 12, the junction block 108 is provided with the open spatial area 386 in which to support the electrical receptacle block 332. The open spatial area 386 is provided, on the lower wall 380, with a slightly recessed locking flange 446.

Returning to FIGS. 14 and 15, the electrical receptacle block 332 is provided with a spring latch 448 disposed within a recess 450 in a lateral side surface 452 of the receptacle block 332. With respect to the particular open spatial area 386 illustrated in FIG. 12, the electrical receptacle block 332 illustrated in FIGS. 14 and 15 can be inserted into the open spatial area 386 so that the electrical receptacle sockets 454 face outwardly from the spatial area 386 illustrated in FIG. 12. The open spatial area 386 is of a sufficient depth and other dimensions so that the receptacle block 332 can be fully inserted into the spatial area 386. When inserted, the locking flange 446 will cause the spring latch 448 to be depressed. The receptacle block 332, with the particular open spatial area 386 illustrated in FIG. 12, may then be moved to the left (in the view shown in FIG. 12) to engage the female receptacle connectors 342. With respect again to the illustration in FIG. 14, the receptacle block 332 also includes recesses 456 so as to accommodate the locking flange 446. In the particular embodiment and views shown in FIGS. 12 and 14, movement to the left by a sufficient distance will cause the spring latch 448 to be moved past the locking flange 446, causing the spring latch 448 to return to its extended and normal position. In this manner, the receptacle block 332 may be retained in a locked position. The receptacle block 332 may be removed from electrical connection with the female receptacle connectors 342 by depressing the spring latch 448 (i.e. pushing upwardly) and sliding the receptacle block 332 to the right. With the spring latch 448 of the receptacle block 332 in a depressed state, the receptacle block 332 will be free to move to the right, in that the spring latch 448 will, so long as it is sufficiently depressed, move above the locking flange 446. When the spring latch 448 is above the locking flange 446 (or even to the right of locking flange 446), and the male connectors 444 are removed from the female receptacle connectors 342, the receptacle block 332 is then free to be moved from the spatial recessed area 386 of the junction block 108. FIG. 15 is a right-hand elevation of the receptacle block 332, showing the right-hand male connectors 444.

Another topic which may be worthwhile to briefly mention relates to the connection of incoming power to the junction block 108 and further into the receptacle block 332. As an example, a source of incoming power may be in the form of what is characterized as an "8-wire" system. In such a system, the incoming terminals or wires may consist of three "hot" wires, three neutral wires and two ground terminal wires. With such a configuration, three separate circuits are provided, with a shared ground for two of the circuits. Of course, ten wire, twelve wire or other multiple wire systems may be readily accommodated, having corresponding numbers of terminals on each of the connectors and providing for a specific number of separate circuits. With such a configuration, eight female connectors would exist within the female connector set 424. Correspondingly, eight female connectors would be incorporated within each female receptacle connector set 342. On the other hand, however, the electrical receptacle block 332, although having room for eight male connectors on each end of the block 332, would typically only have three male connectors extending outwardly from each end of the block 332. One of the male connectors 444 would be adapted to electrically interconnect to a female connector associated with a "hot" wire, while the other two male connectors 444 would be positioned so as to be electrically interconnected to female connectors corresponding to neutral and ground wires. These male connectors 444, although not specifically shown in the drawings, would be electrically connected to the receptacles 454, with each of the hot, neutral and ground corresponding connectors being associated with a different opening (or female terminal) of each of the electrical receptacles 454. In this manner, an electrical receptacle block 332 can be electrically configured so as to provide one circuit to the electrical receptacles 454 from the three incoming circuits. To modify the electrical receptacle block 332, so as to transmit power to the electrical receptacles 454 from another of the three incoming circuits, the male connectors 444 would be reconfigured, so that male connector blades would extend outwardly from both sides of the receptacle block 332 in differing openings. This concept of presenting one circuit to an interconnected electrical receptacle block from a source of multiple incoming circuits is known in the art, and does not form any of the novel concepts of the invention.

The embodiment of an electrical floor access module system as described in the previous paragraphs is directed to a configuration where the junction blocks are releasably mounted to the outside of the access floor modules, although junction blocks may be utilized such that associated electrical receptacle blocks may be pointed inwardly through apertures in the access floor modules. The previously described electrical floor access module systems, in view of their configurations, comprise certain limitations with respect to positioning of electrical receptacle blocks, ease of access to such blocks for interchanging the same, and similar limitations. Also, the previously described embodiments do not incorporate any particular means for wire management, or means for covering the access floor modules.

Figure 16:
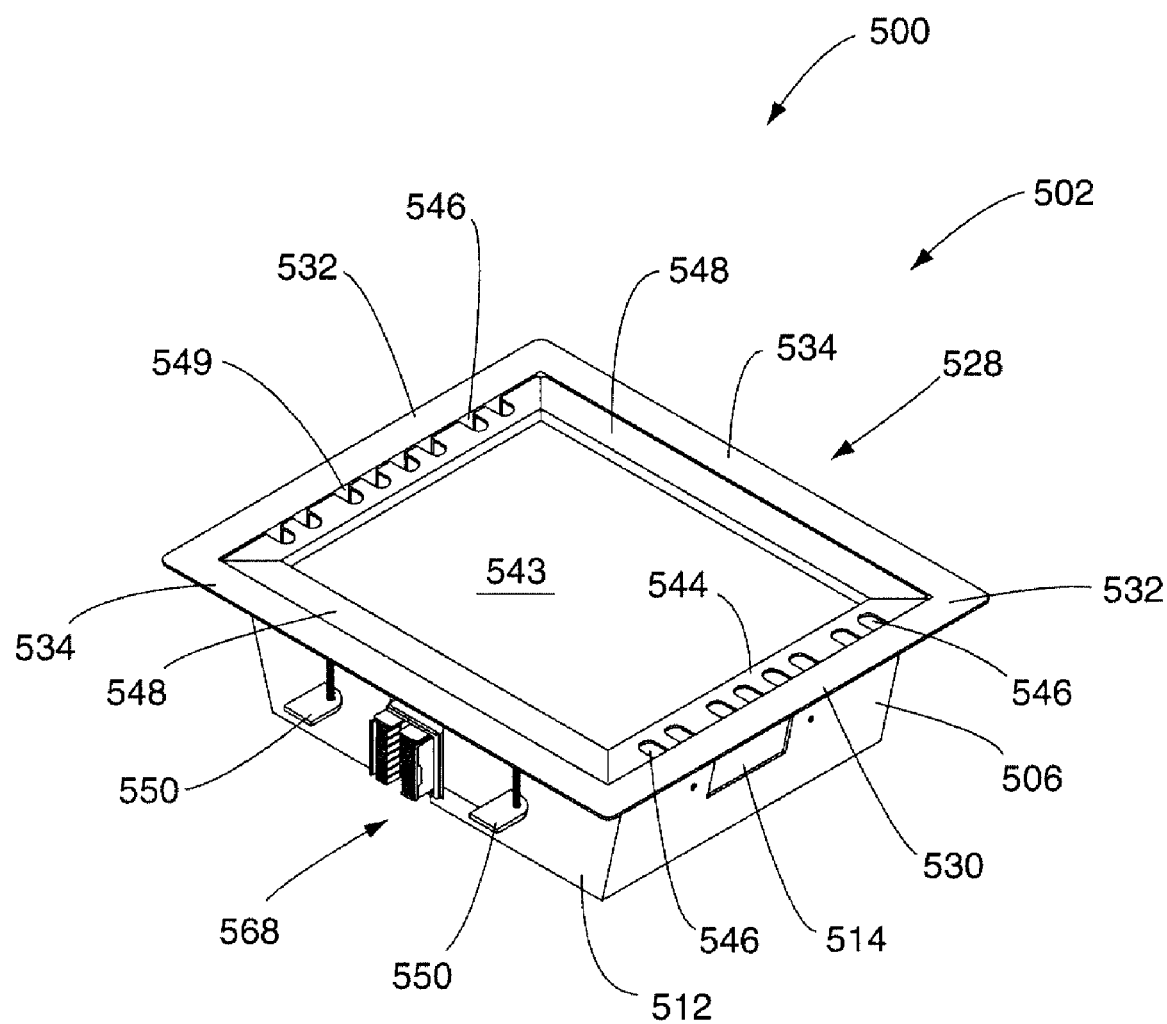
FIG. 16 is a perspective view of another embodiment of an access floor module in accordance with the invention, with the access floor module being shown in a stand alone configuration and in the absence of any internal or external components.

A still further embodiment of an electrical floor access module system in accordance with the invention is illustrated in FIGS. 16-35, and is identified as electrical floor access module system 500. More specifically, beginning with FIG. 16, an access floor module 502 is illustrated. As with other embodiments, the embodiment 500 of the electrical floor access module system comprises a number of access floor modules 502 (one of which is illustrated in FIG. 16 and a number of the other drawings) positioned beneath an access floor 30 (FIG. 1) and mounted by any suitable means above the permanent flooring 58 (FIG. 1).

Figure 17:
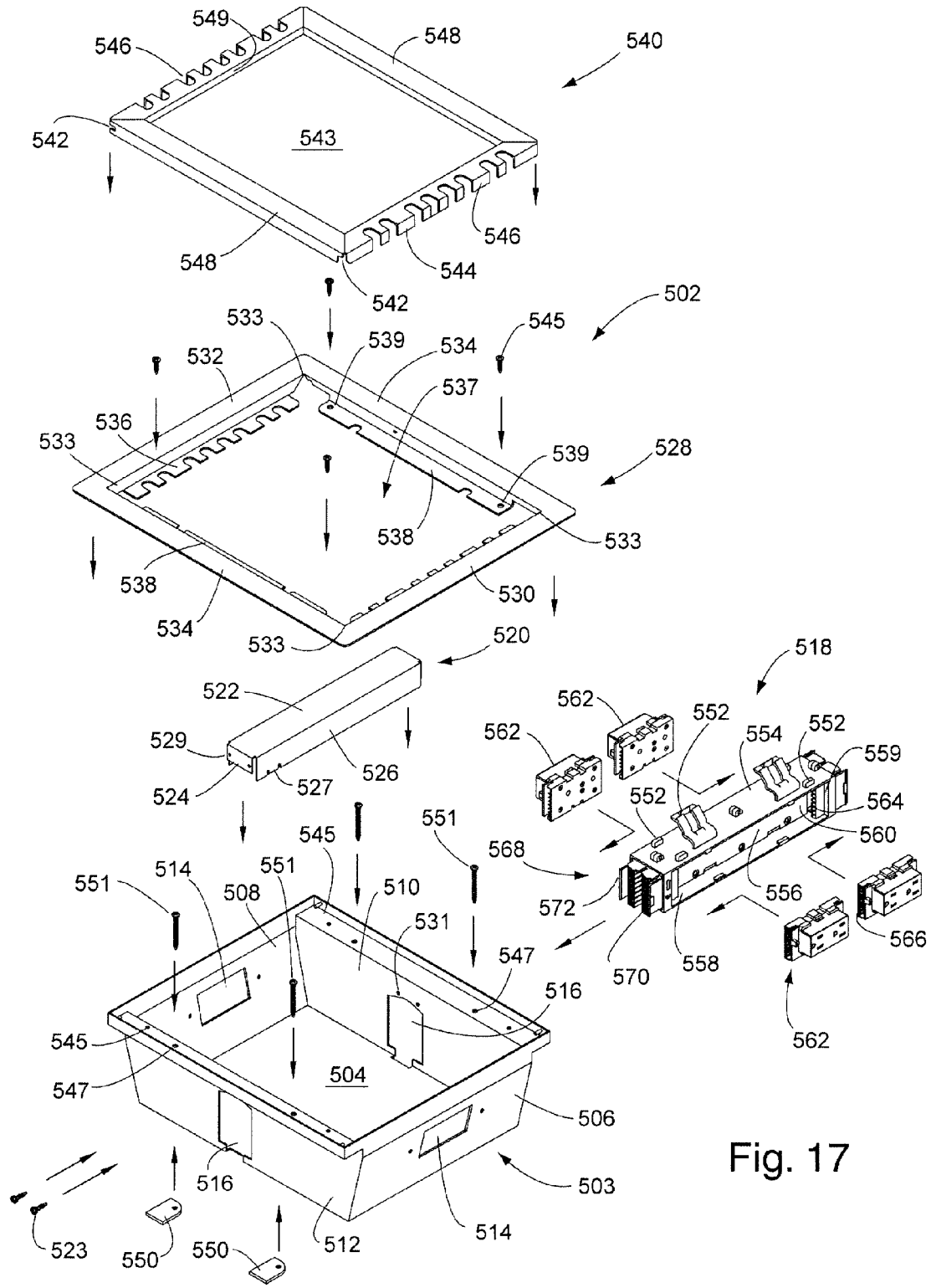
FIG. 17 is an exploded view of the access floor module shown in FIG. 16, with certain electrical components added thereto.

As described in subsequent paragraphs herein, the access floor module 502 comprises a structure to which electrical receptacles and communication outlets may be mounted. The access floor module 502 comprises a basic "building block" of the system 500. With reference to FIGS. 16 and 17, and with FIG. 17 illustrating the access floor module 502 in an "exploded" configuration, the access floor module 502 comprises an access floor module housing 503 which is essentially formed in a square, box-like structure with an open top portion. The access floor module housing 503 comprises a bottom floor portion 504, along with a connected front portion 506 and rear portion 508. The front and rear portions 506, 508 may be integral with or otherwise appropriately connected to the bottom floor portion 504. The front portion 506 and rear portion 508 are each positioned in a substantially vertical configuration, but may be slightly angled relative to a perpendicular axis extending from the bottom floor portion 504. The access floor module 502 also includes a first end portion 510 and a second end portion 512. Each of the end portions 510, 512 may be substantially vertically upright and extend substantially perpendicular to the bottom floor portion 504. In accordance with the foregoing, the access floor module housing 503 is formed in a substantially square and box-like structure.

In each of the front and rear portions 506, 508 is a rectangular aperture 514. The apertures 514 may be utilized to receive communications equipment, such as the voice communications connector 320 and data communications connector 322 illustrated in FIG. 7. A mounting bracket, such as the mounting bracket 318 also previously described with respect to FIG. 7, may be utilized to mount the voice and data communications connectors 320, 322. As also shown in FIG. 7, the communication connectors 320, 322 can be connected to corresponding voice communications line 324 and data communications line 326, respectively. Such communication lines 324, 326 are conventional in nature and can be connected to external communications facilities, such as incoming telephone lines and the like.

The access floor module housing 503 also includes, as illustrated in FIG. 17, electrical apertures 516 located in the first end portion 510 and the second end portion 512. The electrical apertures 516 are sized so as to receive a double-sided junction block 518 which will be described in subsequent paragraphs herein.

Figures 28, 29:
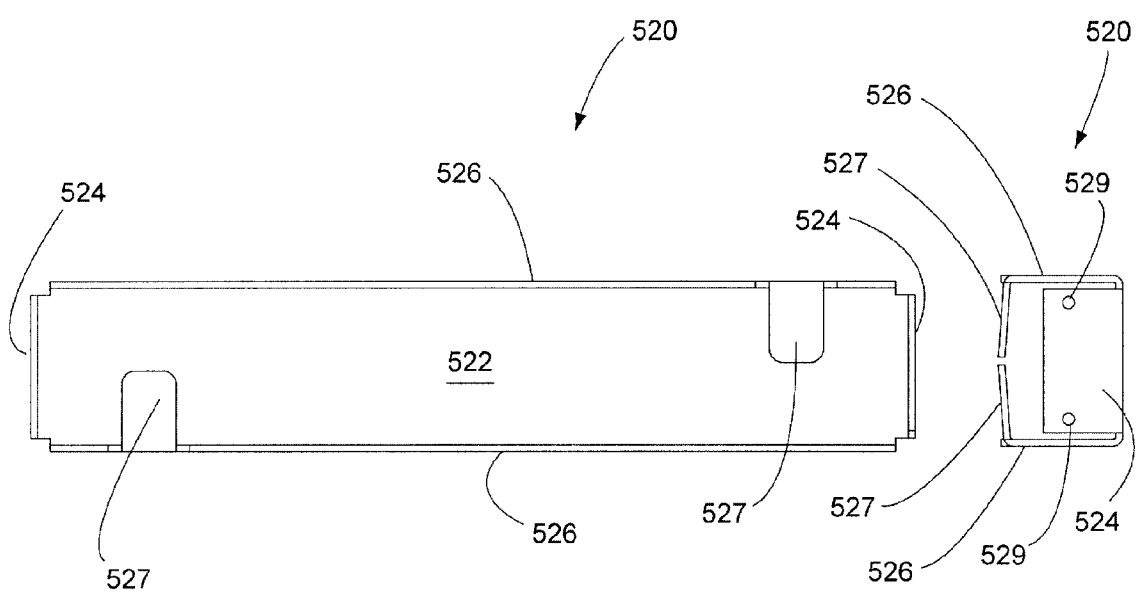
FIG. 28 is an underside view of the junction block support.
FIG. 29 is an end view of the junction block support illustrated in FIG. 28.
Figure 30:
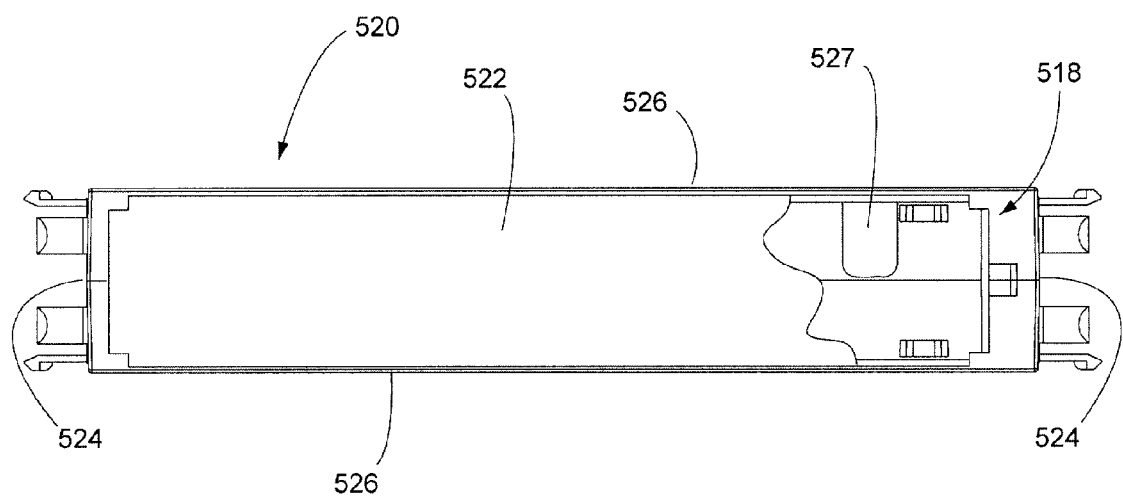
FIG. 30 is a plan view of the junction block support illustrated in FIGS. 28 and 29, and showing by a cutout portion the relationship between the junction block support tabs and the top portion of the junction block.

With further reference to FIG. 17, the access floor module 502 also includes a horizontally disposed junction block support 520. The junction block support 520 is illustrated in perspective view in FIG. 17, in unexploded format. An underside view of the support 520 is illustrated in FIG. 28, while an end view is illustrated in FIG. 29. FIG. 30 shows a plan view of the support 520, and further shows, by cutout portion, the relationship between the junction block support tabs 527 and the top portion of the junction block 518. The support 520 will now be described with respect to FIGS. 17, 28, 29 and 30. More specifically, and as illustrated primarily in FIGS. 17, 28, 29 and 30, the junction block support 520 has an elongated configuration, with an upper or top portion 522, downwardly projecting end members 524 and rectangularly-shaped and downwardly projecting side members 526. If desired, the top portion 522, end member 524 and side member 526 may also be integrally formed from a single piece of stamped metal. The junction block support 520 also includes a pair of tabs 527 located at the lower portion of the side members 526. As primarily illustrated in FIG. 28, one of the tabs 527 can be integrally formed from one side member 526, while the other tabs 527 may be located substantially at an opposing end of the support 520 and be integrally formed from the other side member 526. The tabs 527 can be turned inwardly for purposes of interconnecting to the junction block 518 and for supporting the junction block 518 when the same is centrally positioned within the access floor module housing 503. More specifically, FIG. 30 illustrates the support 520 with a junction block 518 below the support 520. With this configuration, the tabs 527 (only one of which is shown in FIG. 30) are turned inwardly and may be stamp fitted or otherwise connected to the junction block 518 in any suitable manner. For example, the tabs 527 can be turned inwardly so that they are positioned at the upper portion of the spatial area 560 described in subsequent paragraphs herein with respect to the junction block 518. The junction block support 520 can be releasably secured within the access floor module housing 503 through screws or the like inserted through holes 529 located in the side members 526 of the junction block support 520 and holes 531 located in the first end portion 510 and second end portion 512 of the access floor module housing 503.

Further with reference to FIGS. 16 and 17, the access floor module 502 includes a cover bracket 528. The cover bracket 528 is illustrated in a substantially "stand alone" configuration in FIG. 17. The cover bracket 528, as primarily illustrated in FIG. 17, has a substantially square configuration. The cover bracket 528 includes a front portion 530 in the form of an elongated member, with a corresponding rear portion 532. Interconnected to or otherwise integral with the front and rear portions 530, 532, respectively, are opposing and parallel side portions 534. The front and rear portions 530, 532, respectively, and the side portions 534 form an opening 537. Integral with or otherwise connected to the side portions 534 are a pair of connecting braces 538, each connecting brace 538 positioned somewhat inwardly of the corresponding side portion 534. The connecting braces 538 include screw holes 539 through which screws 545 may be inserted, and threadably received within corresponding holes 547 located at the tops of first end portion 510 and second end portion 512 of the access floor module housing 503. In this manner, the cover bracket 528 may be releasably secured to the housing 503.

In addition to the foregoing elements, the cover bracket 528 also includes a series of cord slots 536. As will be described with respect to the cover 540, the cord slots 536 permit extensions of electrical cords, communication cables and the like into the interior of the access floor module housing 503 when the cover 540 is in a closed position.

Turning to the cover 540, and primarily with respect to FIGS. 16, 17, 21-27 and 35, the cover 540, like the cover bracket 528, has a substantially square configuration. The cover 540 includes an inner cover surface 543. The cover 540 also includes a front portion 544 and rear portion 549. The front and rear portions 544, 549, respectively, are interconnected to or otherwise integral with cover sides 548. The cover sides 548 are each elongated and parallel to each other. Correspondingly, the sides 548 are perpendicular to the elongated direction of the front and rear portions 544, 549, respectively. The cover surface 543 may be integral with or otherwise interconnected (by any suitable means) to the front and rear portions 544, 549, respectively, and the cover sides 548.

Figure 35:
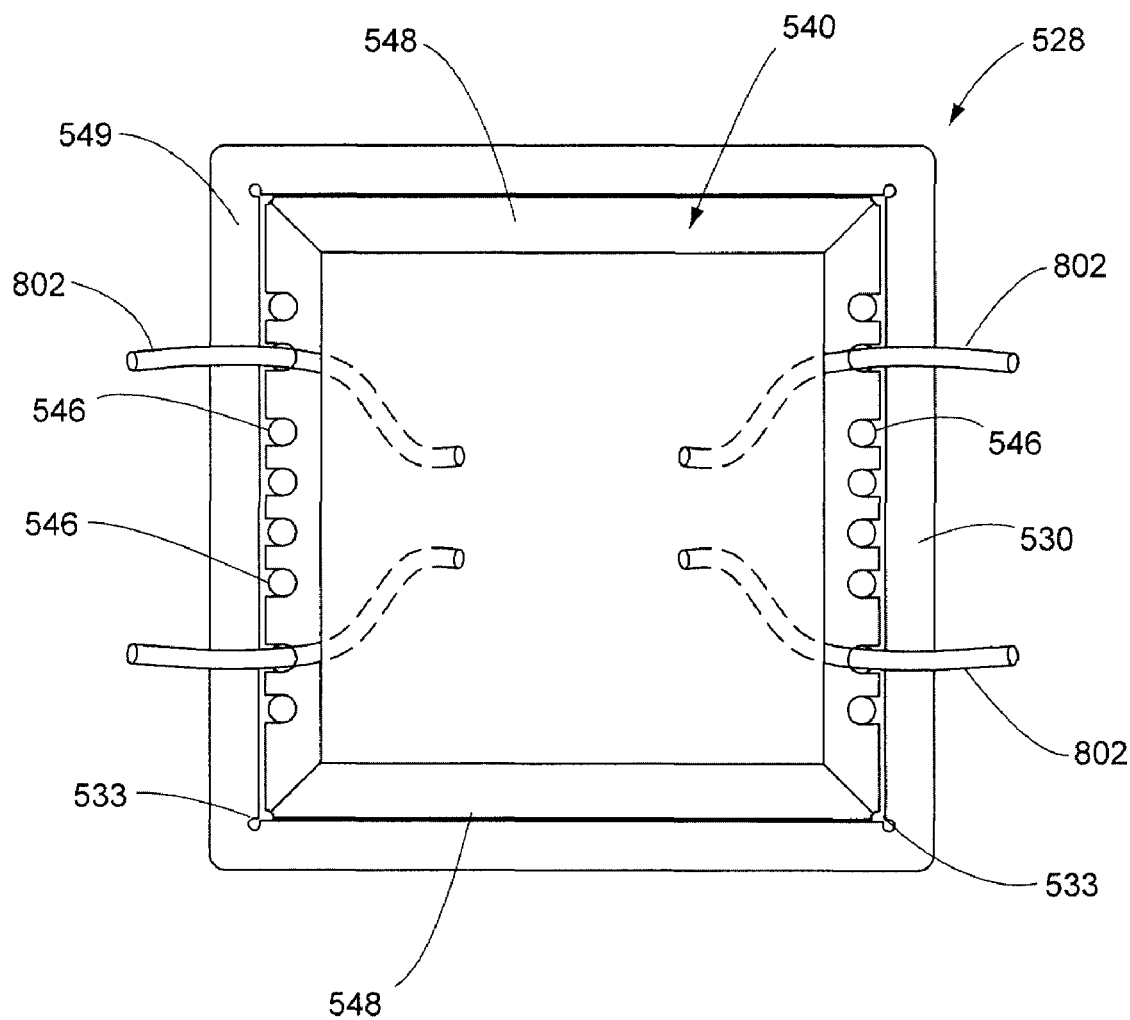
FIG. 35 is a plan view, showing the cover in a closed position relative to the access floor module, and further showing wires or cables extending through the cover while in a closed position.

The cover 540 further includes cord notches 546 which are formed as openings in both the front and rear portions 544, 549, respectively. When assembled as illustrated in FIG. 16, the cord notches 546 of the cover 540 will align with the cord slots 536 of the cover bracket 528 as previously described herein. With this configuration, electrical cords, communication cables or similar items may be extended through the top of the access floor module 502 into the interior of the access floor module housing 503 and interconnected as desired, even with the cover 540 being in a closed position. Such a configuration is shown in the illustration of FIG. 35. Specifically, FIG. 35 is a plan view, showing the cover 540 in a closed position relative to the access floor module 502. The cover 540 is shown as being in the closed position, with electrical and/or communication cables 802 illustrated as extending from outside the cover 540 into the interior of the access floor module housing 503. More specifically, the electrical and/or communication cables 802 extend through the cord notches 546 which are aligned with the cord slots 536 of the cover bracket 528. In this manner, the cables 802 can remain energized, even though the cover 540 remains in a closed position.

The cover 540 may be hingedly mounted to the cover bracket 528 in a manner so that the cover 540 can be rotated between closed and fully open positions relative to the cover bracket 528, and can also be readily removed from the cover bracket 528 without requiring the use of tools. More specifically, the cover bracket 528 includes opposing pairs of hinge pins 533 extending inwardly from the side portions 534 of the cover bracket 528, as primarily shown in FIGS. 17 and 25-27. Correspondingly, the cover 540 includes hinge channels 542 which are essentially "cut out" of each of the sides 548 of the cover 540. As illustrated primarily in FIGS. 25, 26 and 27, the hinge channels 542 are formed in part through a portion of the cover 540 having a pair of ledges 804 located on the front portion 544 and rear portion 549.

Figures 25, 26, 27:
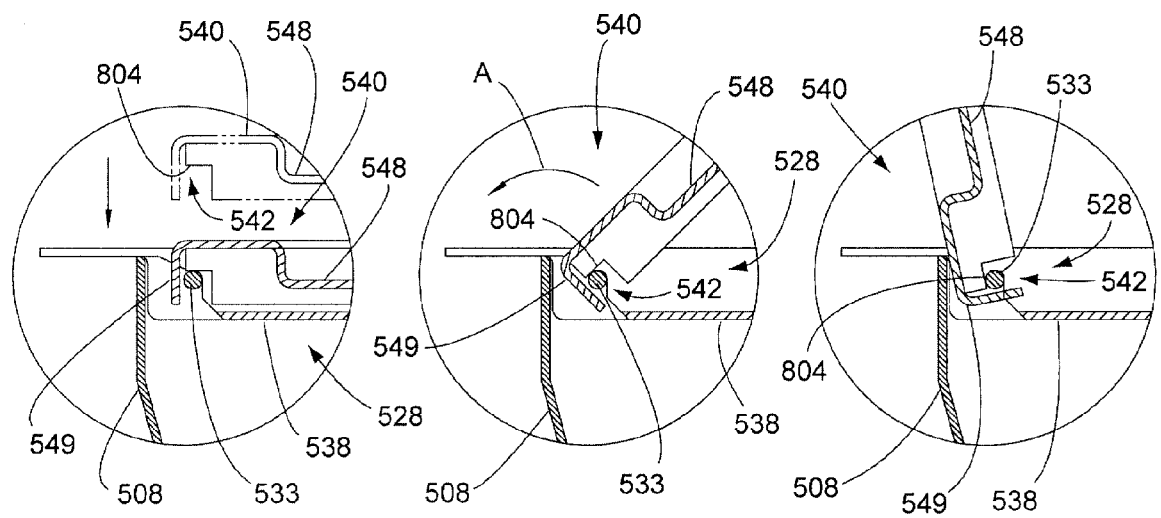
FIG. 25 is an enlarged view of a portion of FIG. 24, illustrating the cover in a closed position.
FIG. 26 is an enlarged view of a portion of FIG. 24, illustrating the hinge operation when the cover is in the position illustrated in FIG. 24.
FIG. 27 in an enlarged view of a portion of FIG. 24, illustrating the cover in a fully opened position, the capability of the cover to be rotated past vertical, and the capability of the cover to be maintained stationary in an opened position in the absence of any external forces.

In accordance with one aspect of the invention, the cover 540 can be removably hinged to the cover bracket 528 through hinge pins 533 in a manner such that the cover 540 can be rotated from a completely closed position to an open position. In this open position, and in accordance with one aspect of the invention, the cover 540 will maintain itself in an open state, until external forces are exerted on the cover 540 so as to move the cover 540 from an open to a closed state. More specifically, and with reference in part to FIGS. 24-27, the cover 540 can first be installed on the cover bracket 528 by a user. FIG. 25 illustrates the cover 540 positioned above the cover bracket 528, and aligned therewith. With this configuration, the cover 540 can then be brought downward to a closed position as further illustrated in FIG. 25. In this position, the hinge pin 533 is received within the channel 542. With this configuration, the cover 540 can be moved downwardly until the hinge pin 533 rests on the ledge 804. Again, this position is shown in FIG. 25. In this position, the cover 540 is in a closed state.

If the user now wishes to open the cover 540, the user can grasp the cover 540 within the notches 546 on the front portion 544. As described in subsequent paragraphs herein, the user can also open the cover 540 by grasping the notches 546 on the rear portion 549. If the user grasps the notches 546, the user can exert upward forces on the cover 540, so as to cause the cover 540 to pivot or rotate about the hinge pin 533 within the channel 542 formed by the rear portion 549 of the cover 540. FIG. 26 illustrates the cover 540 in a partially open state. If the user desires, the user can continue to rotate the cover 540 about the hinge pin 533, until a final, open state of the cover 540 is achieved. FIG. 27 illustrates the cover 540 in a fully, open state. As apparent from FIG. 27, pivotal rotation of the cover 540 is limited by the abutment of the cover 540 against the rear portion 508 of the access floor module housing 503.

At this juncture in the description, one aspect of the system 500 in accordance with the invention should be mentioned. Specifically, with reference to FIG. 27, it is apparent that the relative sizing and configuration of the cover 540 and the cover bracket 528, along with the sizing of the channel 542 and hinge pin 533, permit the cover 540 to be rotated "past 90°," relative to horizontal. This rotation is illustrated in FIG. 27. With the cover 540 in the position shown in FIG. 27, abutting the rear portion 508 of the housing 503, the cover 540 will maintain itself in the position shown in FIG. 27, until external rotational or similar forces are exerted on the cover 540 by a user. If the user wishes to close the cover 540, these forces can be exerted on the cover 540, and the cover 540 will move from the position shown in FIG. 27 to the closed position shown in FIG. 25. If the user then wishes to remove the cover 540, the cover 540 can be manually lifted in a vertical direction from its closed state as shown in FIG. 25.

Figure 21:
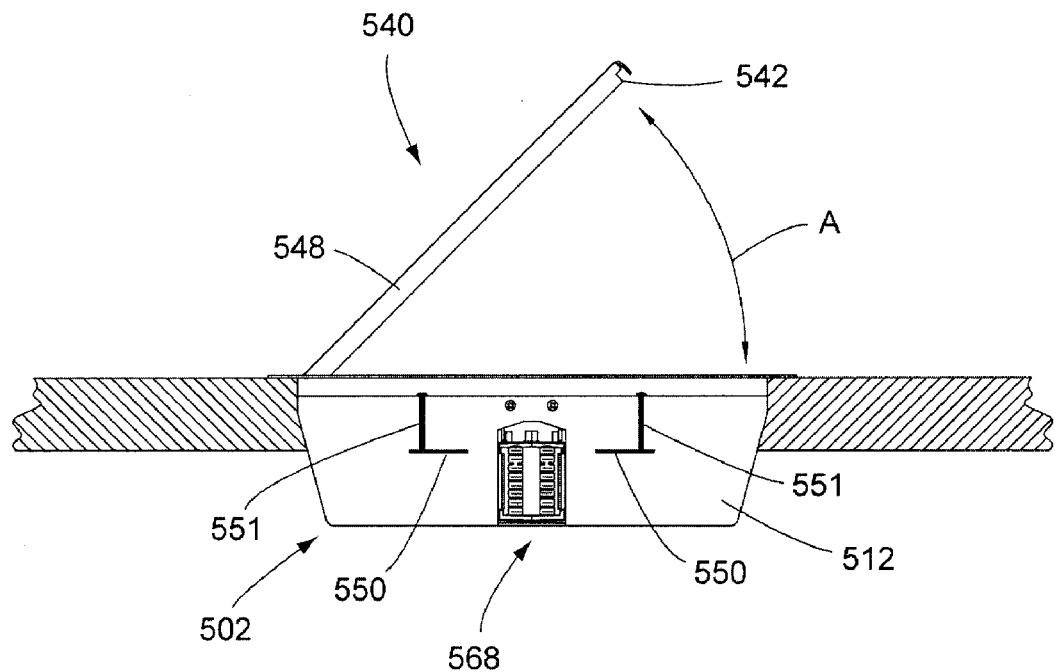
FIG. 21 is a partial elevation view of the interconnection of the cover illustrated in FIG. 17 to the access floor module, through a hinge.
Figure 22:
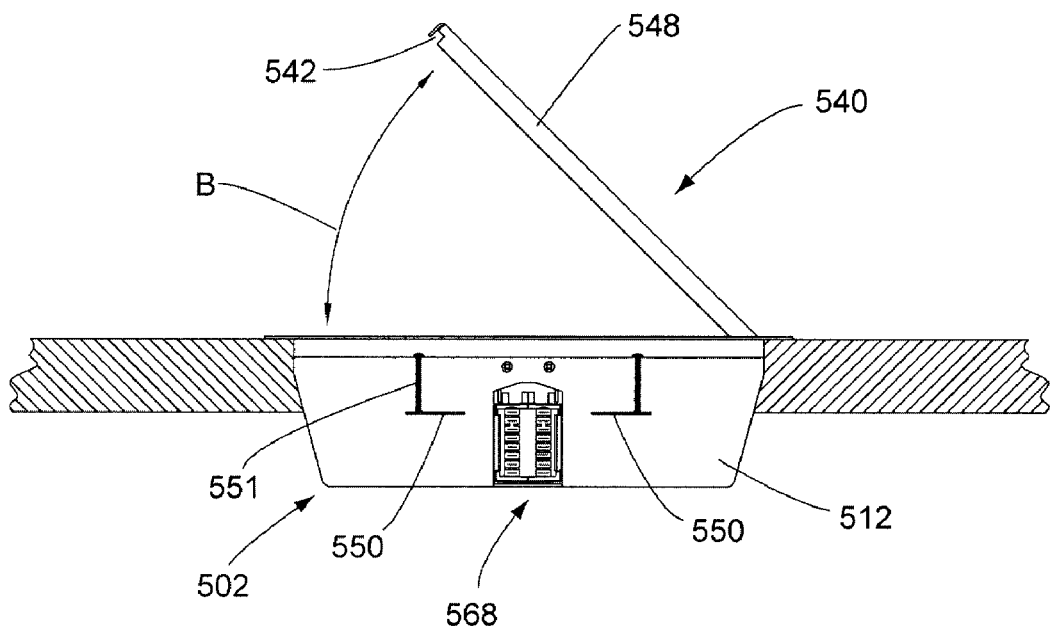
FIG. 22 is a partial elevation view similar to FIG. 21, but showing the cover being rotated in an opposing direction to the configuration illustrated in FIG. 21.

In accordance with the foregoing aspect of the invention, the cover 540 can be removably hinged to the cover bracket 528 in a manner such that the cover 540 can be rotated from closed to open positions. Further, however, in accordance with another aspect of the invention, the cover 540 and the cover bracket 528 are constructed so that the cover 540 can be rotated between closed and open positions in either of two opposing directions. This concept is primarily shown in FIGS. 17, 21 and 22. Also, reference can again be made to FIGS. 24-27. As earlier described, the cover 540 can be installed on the cover bracket 528 by a user, by vertically placing the cover 540 on the cover bracket 528, with the hinge pins 533 being received within the hinge channels 542. As shown in FIGS. 21 and 22, the hinge pins 533 not only include a hinge pin 533 adjacent the rear portion 549, but also a hinge pin 533 located adjacent the front portion 544. In accordance with the invention and this aspect thereof, the front portion 544 of the cover 540 can correspond in size and specific structure to the rear portion 549 of the cover 540.

In accordance with this structure, with the hinge pins 533 first received within the appropriate hinge channels 542, the cover 540 may be rotated to the position illustrated in FIG. 21, about the hinge pin 533 located adjacent the rear portion 549. This would be a counter-clockwise rotation as viewed in FIG. 21, about the arrow designated arrow A. This would also be a rotation which primarily corresponds to that illustrated in FIGS. 24-27. However, if the user wishes to open the cover 540 in the opposing direction, the user can grasp the cover 540 within the notches 546 on the rear portion 549. The user can then exert upwardly directed forces on the cover 540, so as to cause the cover 540 to pivot or rotate about the hinge pin 533 within the channel 542 formed by the front portion 544 of the cover 540. This rotation about the hinge pin 533 associated with the front portion 544 is illustrated in FIG. 22. In this configuration, and as viewed in FIG. 22, rotation from a closed to an open position can occur about the hinge pin 533 in a clockwise direction about arrow B. It should be noted that not only does the cover 540 and cover bracket 528 permit rotation along a hinge axis in either of two opposing directions, but also such selective rotation is provided regardless of the orientation of the cover 540 relative to other components of the access floor module 502. That is, with reference to FIG. 17, the cover 540 could be rotated 180°, and the exact same functional operation is permitted. Accordingly, rotation of the cover 540 from a closed to an open position is permitted in either of two opposing directions, without requiring any modification in the orientation of the cover 540 relative to the cover bracket 528. It should also be noted that the cover bracket 528 as described herein has a configuration where each side portion 534 is identical to the other side portion 534, and the front portion 530 is identical to the rear portion 532. This reversible edging of the cover 540 and the cover plate 528, as explained in the foregoing paragraphs, may be characterized as a "double-hinged" cover. Further, if desired, notches could be cut into the sides 548 of the cover 540 and the sides 534 of the cover bracket 528. Further, additional hinge pins 533 could be located longitudinally along the sides 534 of the cover bracket 528. In this manner, the cover 540 and a cover plate 528 can be constructed so as to not only allow opening and closing rotation of the cover 540 in two opposing directions, but also allow opening and closing rotation in all four directions. This configuration is made apparent by the illustrations and descriptions herein of the cover 540 and cover bracket 528.

As previously mentioned herein, the access floor module 502 in accordance with the invention includes a junction block 518. A primary concept of an access floor module in accordance with this particular aspect of the invention is that the junction block 518 may be positioned internal to the access floor module housing 503 and in a "centered" configuration. With this centered configuration, a substantial number of electrical receptacle blocks 562, as described in subsequent paragraphs herein, may be provided within a single access floor module housing 503. However, it should be emphasized that various types of junction blocks may be utilized, other than junction block 518, without departing from the primary concepts of the invention. Additional details regarding the junction block 518 will be set forth in subsequent paragraphs herein.

Figure 18:
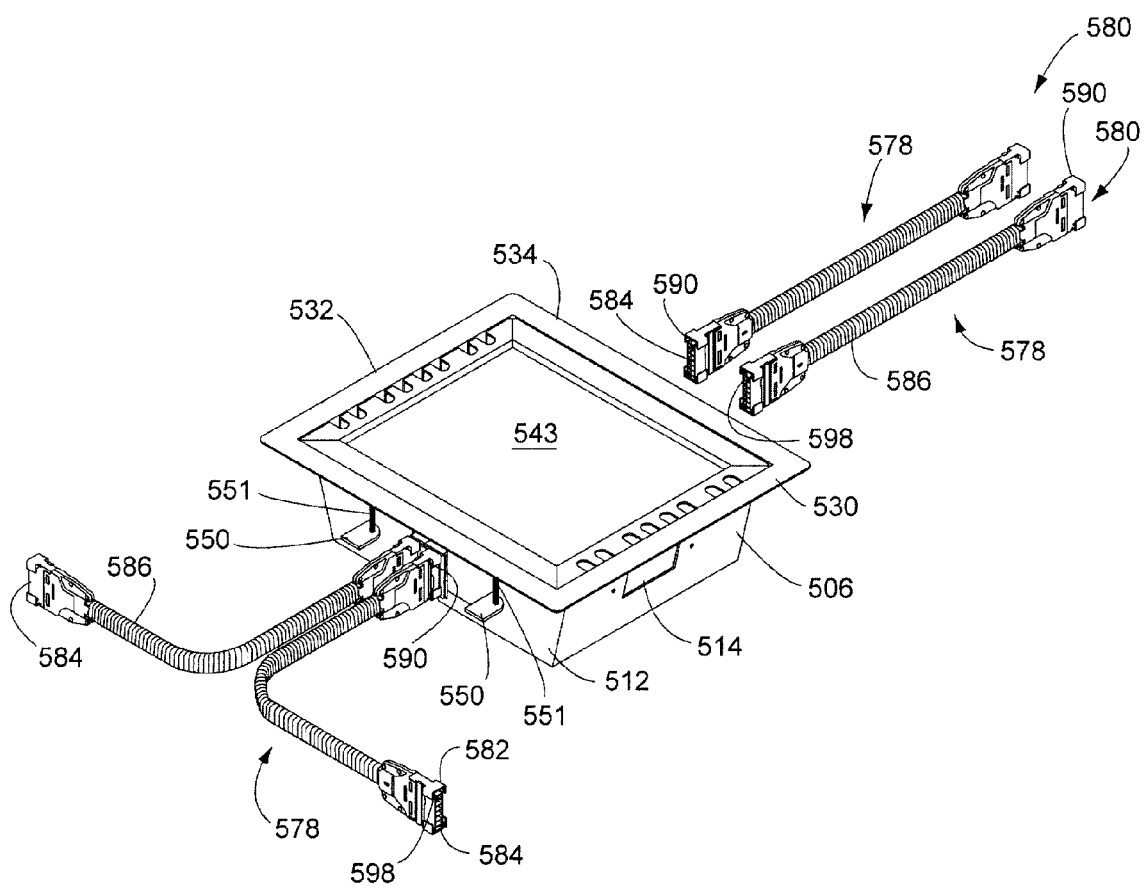
FIG. 18 is a perspective view of the access floor module illustrated in FIGS. 16 and 17, with the addition of interconnecting cables for supplying power to electrical components within the access floor module, and for electrically interconnecting the access floor module with other access floor modules.
Figure 24:
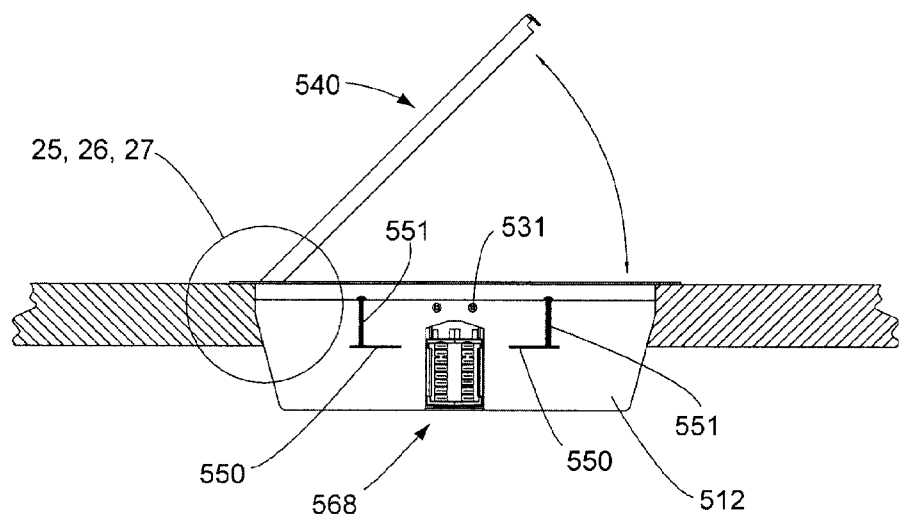
FIG. 24 is an elevation view similar to FIG. 21, and showing a location for illustrating in detail the operation of the hinge arrangement between the cover and the access floor module.

In addition to the other elements of the access floor module 502 as described in the foregoing paragraphs, the floor module 502 may also include a pair of connecting brackets 550, mounted on both the first end portion 510 and the second end portion 512 (FIG. 17 illustrates only a single pair of the connecting brackets 550 associated with the second end portion 512) of the housing 503. The connecting brackets 550 can be secured to the access floor module housing 503 through the use of screws 551 extending through apertures within the first end portion 510 and second end portion 512 of the access floor module housing 503. The connecting brackets 550 may be adjusted in vertical position and utilized to appropriately secure the access floor module 502 to stationary floor elements (not shown) as desired. An assembled illustration of the connecting brackets 550 mounted to the screws 551 on the second end portion 512 of the access floor module housing is illustrated in FIG. 18. In addition, such an assembled version is also illustrated in FIG. 24.

Figure 23:
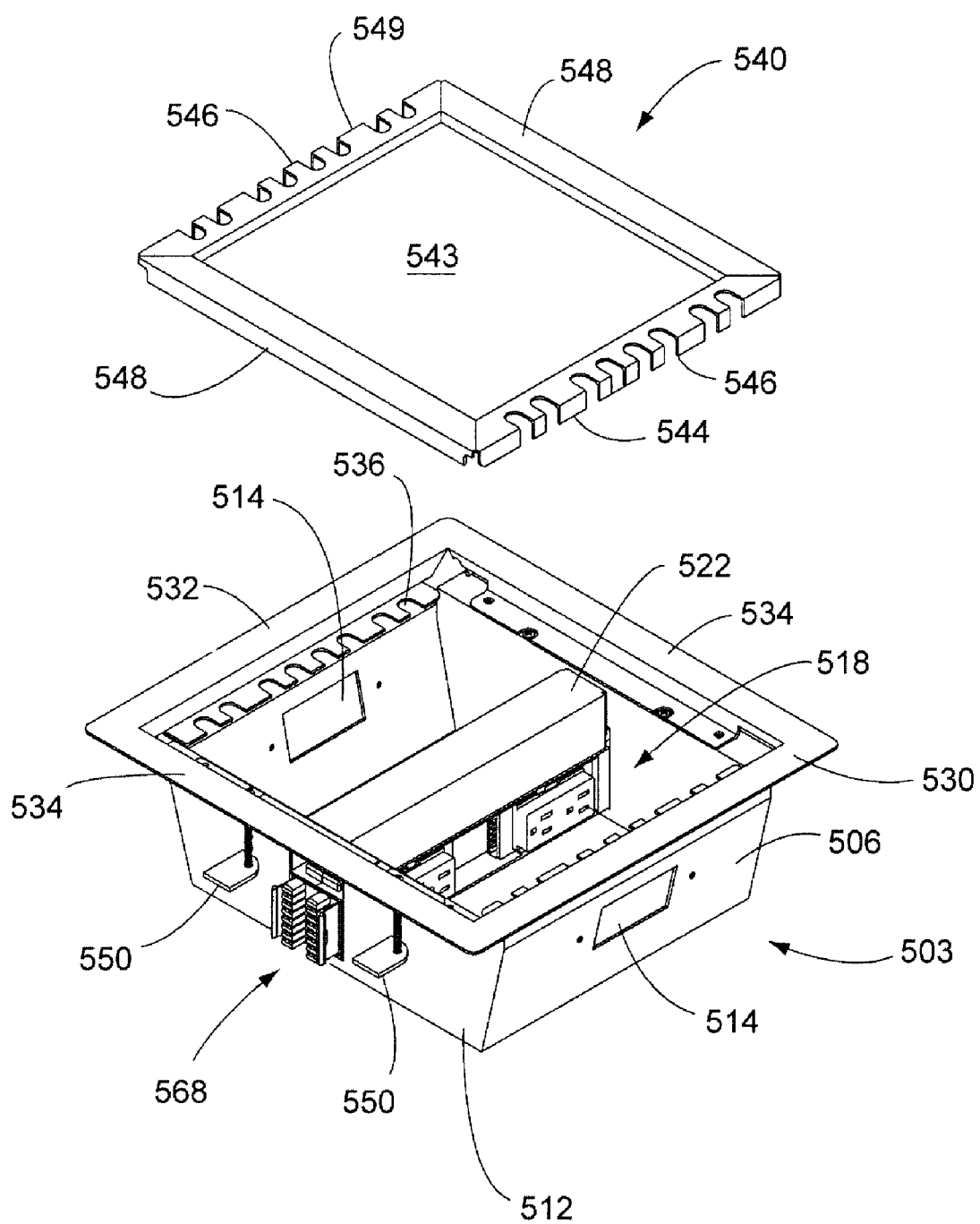
FIG. 23 is a perspective view of the access floor module housing with the junction block and associated receptacles assembled therein.

The junction block 518 can be inserted through the electrical apertures 516 on the first end portion 510 and second end portion 512 of the module housing 503. In this manner, and as shown in FIG. 23, the junction block 518 can be centered within the access module housing 503. For purposes of attachment, the junction block 518 can be attached to the junction block support 520 through screws or the like which will extend through tabs 527, and which will interconnect with latch members 552 on the upper wall 554 of the junction block 518. These elements and attachments are primarily shown in FIGS. 16, 17, 23, 28, 29, 30 and 31. As previously described, the junction block support 520 can be secured to the access floor module housing 503 through screws or similar connecting means (not shown) extending through holes 531 of the floor module housing 503 and holes 529 in the end members 524 of the junction block support 528.

Figure 31:
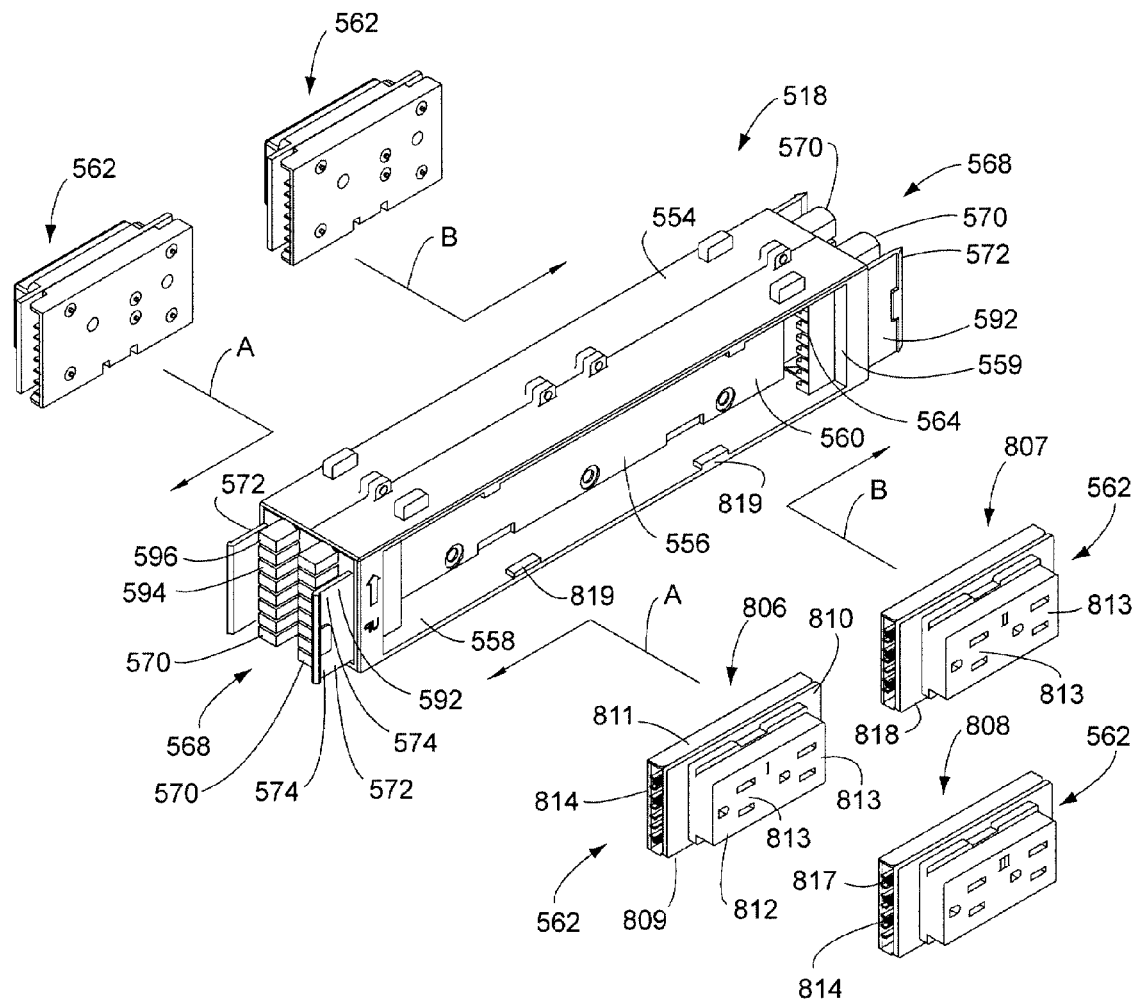
FIG. 31 illustrates the relationship between the junction block and electrical receptacle blocks, and showing the relative positioning for purposes of interconnecting the same, in addition to illustrating three of the electrical receptacle blocks as having differing circuit configurations.

With reference again to FIGS. 17 and 31, the junction block 518 comprises a housing having an upper wall 554, lower wall 558, and middle walls 556. The walls 554, 556 and 558 serve to form a spatial area 560 as shown in FIGS. 17 and 31. A similar spatial area 560 is formed on the opposing side (not shown) of the middle walls 556. The spatial areas 560 may be utilized to accommodate electrical receptacle blocks, such as the receptacle blocks 562 illustrated in FIG. 17. For purposes of energizing the electrical receptacle blocks 562, the junction block 518 includes, within each spatial area 560, a pair of connector sets 564 (only one of the connector sets 564 being illustrated in FIGS. 17 and 31). The connector sets 564 are located on opposing side walls 559 within the spatial areas 560 of the junction block 518. In the particular embodiment illustrated in FIGS. 17 and 31, the connector sets 564 comprise female connectors. With respect to the electrical receptacle block 562, each block includes a pair of opposing male connector sets 566, electrically connected to each other through conductors or bus bars (not shown) or the like within the bodies of the receptacle blocks 562. The male connector sets 566 are primarily shown in FIG. 31. These electrical receptacle blocks 562 can substantially correspond to the receptacle blocks 332 illustrated in FIGS. 14 and 15, and previously described herein. For purposes of subsequent description, FIG. 31 illustrates five of the electrical receptacle blocks 562. As earlier stated, the male connector sets 566 are adapted to receive the corresponding female connector sets 564, which are located at opposing ends of each of the receptacle blocks 562 in this particular embodiment. The concept of engaging receptacle blocks within junction blocks of this type is disclosed in my currently pending international patent application entitled MULTIPLE CIRCUIT RECEPTACLES.

Turning again to the junction block 518 (FIGS. 17 and 31), the block 518 includes female connector block pairs 568 extending outwardly from opposing ends of the junction block 518. Each of the female connector block pairs 568 includes a female connector set 570. Each of the female connector sets 570 of each female connector pair 568 is provided with a side flange 572 having upper and lower recessed areas 574. The upper and lower recessed areas 574 are adapted to assist in providing engagement with the cable assemblies 578 subsequently described herein.

Turning to the cable assemblies 578, and specifically with respect to FIG. 18, each of the cable assemblies 578 includes a male or end connector block 580 comprising a male connector 582 having a series of male connector terminals 584 positioned at the ends thereof. The cable assemblies 578 further include interconnecting cables 586. The interconnecting cables 86 interconnect the blocks 580 of each of the cable assemblies 578. For purposes of accommodating distance requirements between and among access floor modules 502, the cable sections 586 may be adjustable and comprise expandable, flexible conduit. For purposes of providing such adjustability, the end connector blocks 580 may be provided with an inner spatial area as shown in FIG. 6 with respect to end connector block 106. The inner spatial area can be provided for storage of excess length of electrical wiring in a coiled or other similar configuration. This type of arrangement is similar to that disclosed in my earlier patent, U.S. Pat. No. 5,096,434 issued Mar. 17, 1992, and further disclosed in my still earlier patent, U.S. Pat. No. 4,579,403 issued May 1, 1986. The interconnecting cable sections 586 are preferably constructed of flexible conduit which may be bent to accommodate connections to others of the access floor modules 502 and other components of the system 500.

Returning again to FIG. 31, the upper and lower recessed areas 574 of the female block connector pairs 568 are adapted to assist in providing engagement with flanges 590 of one of the male or end connector blocks 580 associated with the cable assembly 578 (FIG. 18). In this manner, a releasable locking engagement is provided between a female connector set 570 and the male connector terminals 584. The side flanges 572 may be made of a resilient plastic material and formed integral with the housing of the junction block 518 to which they are associated. Preferably, the side flanges 572 are also provided with an outwardly extending inclined end surface 592. When the surfaces 592 are engaged by flanges, such as the flanges 590 of the male connector 582, the side flanges 572 will be deflected inward, allowing the flanges 590 of the male connector 582 to engage the recesses 574, thereby providing a releasable locking engagement of the male and female connectors. Preferably, each of the female connector sets 570 is provided with a plurality of female connector terminals 594 and a key lug 596.

Correspondingly, the male connector 582, as previously described herein, is provided with a plurality of male connector terminals 584 and an opening 598 for receiving the key lug 596.

With respect to details associated with each of the electrical receptacle blocks 562, these receptacle blocks are similar in structure and function to the electrical outlet receptacle blocks 332 previously described herein. However, the particular electrical receptacle blocks 562 illustrated in FIGS. 31-34 have a slightly different configuration, although functioning substantially the same as the receptacle blocks 332

More specifically, and with reference to FIGS. 31-34, each of the electrical receptacle blocks 562 includes a housing 809. The housing 809 includes a first facial wall or surface 810.

The outlet receptacle block 562 further comprises a receptacle face 812. Located on the receptacle face 812 are a pair of three-pronged receptacles 813. In this particular embodiment, the receptacles 813 each include a hot conductor, neutral conductor and ground conductor. For purposes of securing a receptacle block 562 to a junction block 518, various types of latching arrangements may be utilized. In one latching arrangement, locking latches (not shown) may be formed on a lower wall 818. Each of the locking latches may be resilient in nature, and formed so that upwardly directed forces on a locking latch would cause the locking latch to deflect and bend upwardly relative to its connection to the lower wall 818. The locking latch may consist of a well-known resilient, plastic material. Such materials permit deflection in the presence of external forces, and also exhibit internal restoring forces when the deflecting forces are removed. Such locking latches are well known in the art. For example, such a locking latch is disclosed in my co-pending international patent application entitled MULTIPLE CIRCUIT RECEPTACLES.

Each of the electrical outlet receptacle blocks 562 further includes a pair of male connector sets 814, with each of the male connector sets 814 extending outwardly from opposing ends of the receptacle blocks 562, as primarily illustrated in FIGS. 31-34. For purposes of description, the individual ones of the pair of male connector sets 814 are designated as the first male connector set 815 and the second male connector set 816. Each of the male connector sets 815, 816 include a particular configuration of male or bus bar terminals 817. For reasons apparent after subsequent descriptions herein, the male terminals 817 exist only within certain of the connectors of the first and second male connector sets 815, 816.

Figure 32:
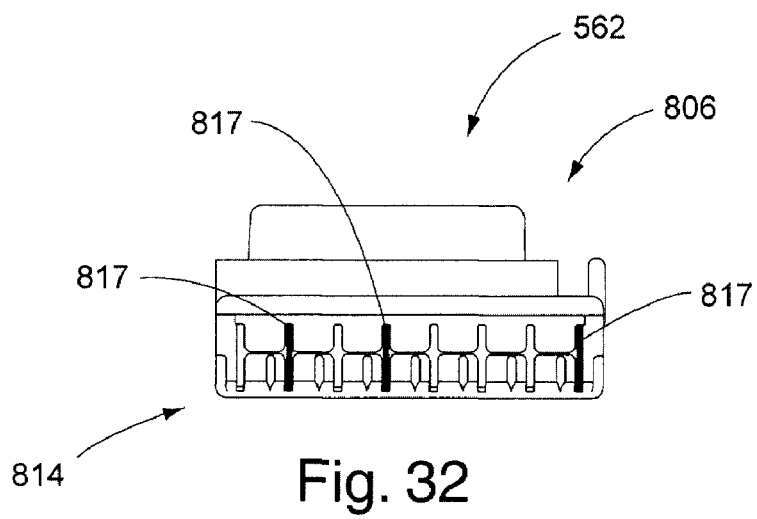
FIG. 32 is an end view of the electrical receptacle block illustrated in FIG. 31 as 806.
Figure 33:
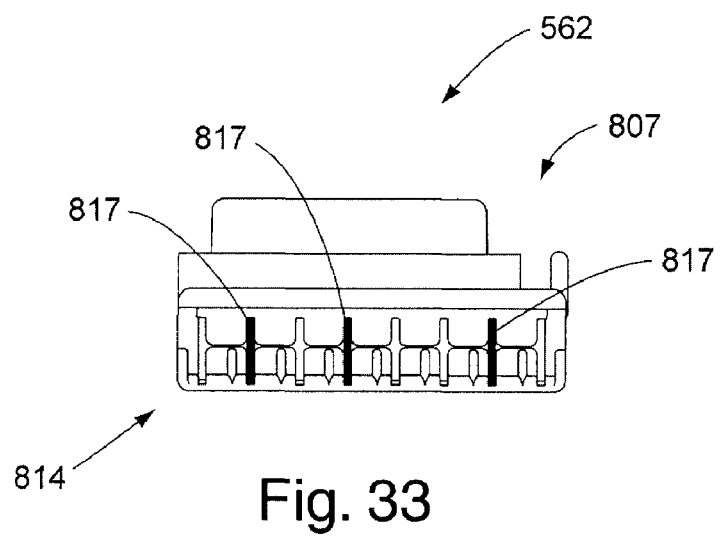
FIG. 33 is an end view of the electrical receptacle block illustrated in FIG. 31 as 807.
Figure 34:
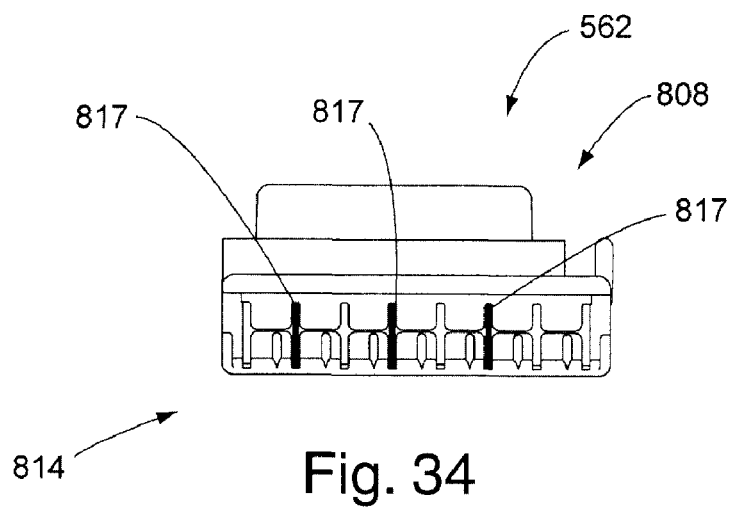
FIG. 34 is an end view of the electrical receptacle block illustrated in FIG. 31 as 808.

As known in the electrical industry, incoming power to a modular office system or the like may include multiple circuits. For example, in a system which is often referred to as an "8-wire" system, three electrical circuits may be realized, with each circuit employing a hot, neutral and ground connection. Such systems can also include 7-wire, 5-wire or similar circuit configurations, depending upon the relative number of hot, neutral and ground input terminals, and how many of the circuits can share a common ground and the like. With the configuration shown in FIG. 31, and the previous description herein of the cables 578, incoming power may be applied to the system 500 having an 8-wire configuration, with three circuits. With this configuration, the female connector set 564 previously described herein will have eight separate female connector terminals. However, although all eight terminals are presented within the junction block 518, it would be desirable for each of the electrical outlet receptacle blocks to present only one circuit to the receptacles 813. Further, it is typically desirable to have the same circuit presented to the same pair of receptacles 813 which exist within a single electrical outlet receptacle block 562. Accordingly, when one of the outlet receptacle blocks 562 is electrically connected to a female connector set 564 on the junction block 518, the electrical outlet receptacle block 562 will have bus bar terminals 817 existing only within three of the eight available slots. This concept is particularly shown in FIGS. 32, 33 and 34. For purposes of the description, FIG. 32 is illustrated as having an electrical receptacle block 562, and is further designated as receptacle block 806. It can be noted that the bus bar terminals 817 which exist within the receptacle block 806 are located only within three of the slots available for bus bar terminals. Correspondingly, FIG. 33 illustrates an electrical receptacle block 807. Block 807 is identical to block 806, with the exception that the bus bar terminals 817 are located in different slots. More specifically, for the receptacle block 807 to present to its receptacles 813 a different circuit than that associated with receptacle block 806, the bus bar terminal 817 which is associated with a "hot" terminal, must be within a different slot than that associated with receptacle block 806. Correspondingly, receptacle block 808 illustrated in FIGS. 31 and 34, presents a still further slot configuration for the bus bar terminals 817. Accordingly, the receptacle blocks 806, 807 and 808 represent receptacle blocks which, when any given one is electrically connected to the junction block 518, will present a different electrical circuit to its associated pair of receptacles 813. It is in this manner that the same junction block 518 can be utilized for any one or more of the multiple circuits, in a manner so that differing multiple circuits can be presented at outlet receptacles associated with receptacle blocks. This concept is described in even greater detail in my previously referenced co-pending international patent application entitled MULTIPLE CIRCUIT RECEPTACLES.

Reference will now be made to FIG. 31, with respect to electrical and mechanical connection of the outlet receptacle blocks 562 to the junction block 518. Each of the receptacle blocks 562 could first be positioned in the locations shown in FIG. 31. Further, the junction block 518 can include locking tabs 819, located on the lower wall 558, on each side of the junction block 518. As a receptacle block 562 is moved into the spatial area 560, the position of the locking tab 819 will cause a locking latch (not shown) on the receptacle block 562 to deflect upwardly as a receptacle block 562 is moved into the spatial area 560. The spatial area 560 will be of a sufficient depth and other dimensions so that the receptacle block 562 can be fully inserted into the spatial area 560. After insertion of the receptacle block 562 into the junction block 518, with the locking latch deflected upwardly by the tab 819, the receptacle block 562 can be moved to either the "left" or the "right," as illustrated by the arrow lines A and B in FIG. 31. As the receptacle block 562 is moved into the spatial area 560, two processes occur simultaneously. Specifically, one of the male connector sets 815, 816 moves into an electrical engagement with the female connector set 564 located on one of the end walls 559 of the junction block 518. As previously described herein, the male connector sets 815, 816 will have bus bar terminals 817 only within certain of the connector terminals of the connector sets 815, 816. Accordingly, electrical connections will be made between the bus bar terminals 817 and only certain of the female connector terminals of the connector set 564.

At the same time as the electrical connection is being made between the receptacle block 562 and the junction block 518, and as a receptacle block 562 is being moved either to the left or the right within the spatial area 560, movement of a certain distance will cause the locking latch (not shown) on the receptacle block 562 to be moved past the locking tab 819. When the lacking latch is fully moved to one side of the locking tab 819, upwardly directed external forces exerted by the locking tab 819 are no longer applied to the locking latch, and the locking latch moves downwardly to its "normal" position, i.e. its configuration in the absence of any externally-applied forces. In this position, the receptacle block 562 cannot be removed from its electrical engagement with the junction block 518, in the absence of external forces exerted in a specific direction on the locking latch. That is, any attempt to move the receptacle block 562 in a direction opposing its interconnection direction with the female connector set 562, is prohibited by the position of the locking tab 819 relative to the locking latch. To actually disengage and electrically decouple the receptacle block 562 from the junction block 518, upwardly directed forces must be exerted on the locking latch. These forces must be sufficient so as to deflect the first locking latch upwardly a sufficient distance so that the outer tab of the locking latch is essentially "above" the top of the locking tab 819. In this configuration, the locking latch is permitted to move to a position so that it is above the locking tab 819. This "freedom" of movement correspondingly permits the male terminals 817 of the male connector sets 815, 816 to be electrically disengaged from the female connector terminals of the female connector sets 561 of the junction block 518. The concepts set forth in the immediately foregoing paragraphs are also described in my co-pending international patent application entitled MULTIPLE CIRCUIT RECEPTACLES.

The foregoing has described a number of significant advantages of floor module system 500, employing the access floor modules 502. For example, with respect to the cover 540, previously described herein, it is noted that the cover 540 acts as a "double-hinged" cover, and can be rotated between closed and open positions between either of two opposing directions. It is also true that with slight modifications, the cover 540 could be opened in any one of four different directions.

Further, it should be noted that all floor modules 502 are essentially equivalent in structure. Accordingly, the electrical receptacles 562 are completely interchangeable among floor modules. Still further, the cable assemblies 578 can all be of the same structural configuration, with respect to the end connector blocks 580 and the interconnecting cables 586. For purposes of accommodating various floor configurations, the various cable assemblies 578 to be used in the configuration need only be of differing lengths.

Figure 19:
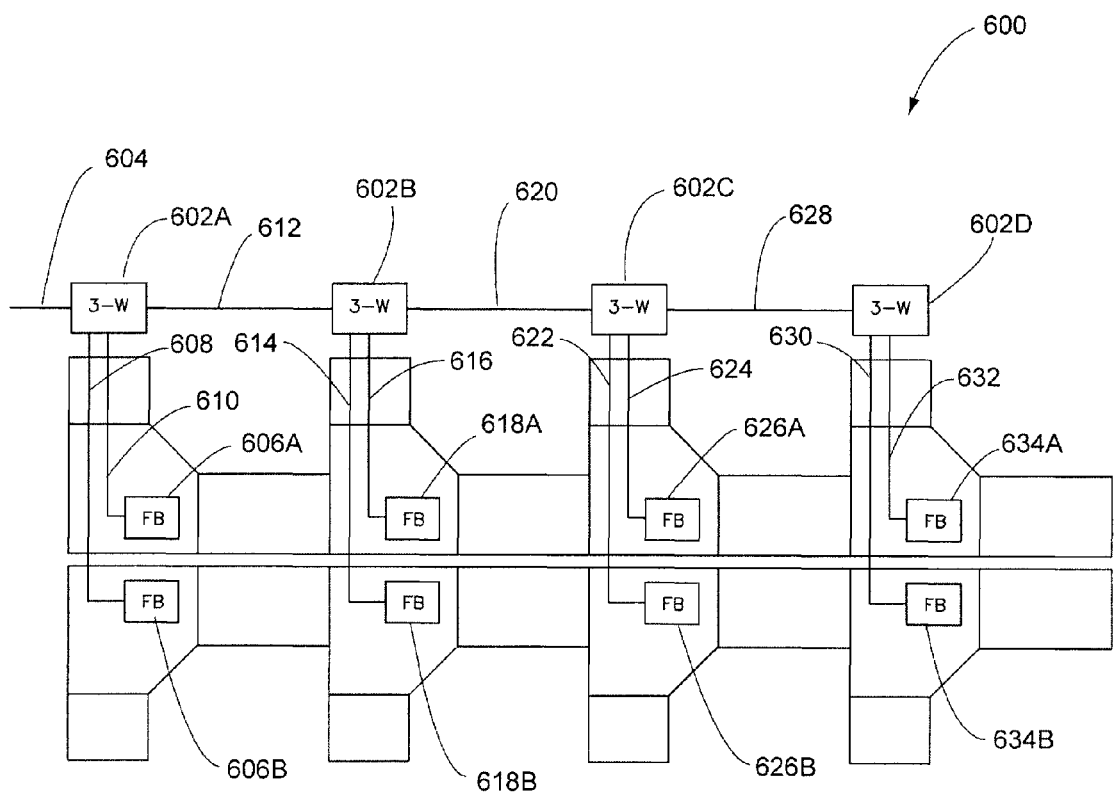
FIG. 19 is a prior art block diagram illustration of the manner in which floor modules in prior art systems were connected for purposes of receiving power.
Figure 20:
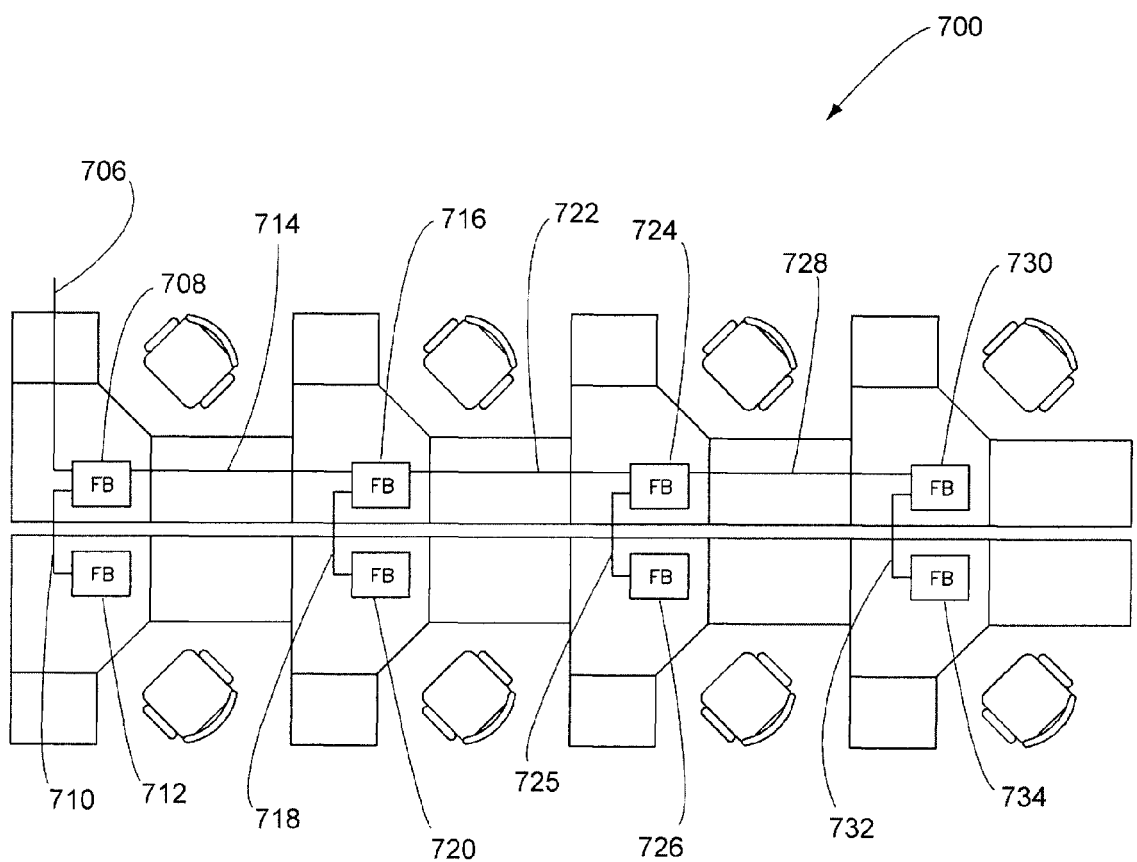
FIG. 20 is a block diagram illustration of interconnection of access floor modules to a power supply source and to each other in accordance with the invention.

A significant advantage with respect to configuration of the access floor module system 500 in accordance with the invention is illustrated in FIGS. 19 and 20. FIG. 19 illustrates a prior art access floor module system 600. In this particular system, illustrated in block diagram format, external power is supplied through cable 604. The external power on cable 604 is first applied as an input to the three-way splitter 602A. The three-way splitter 602A is an electrical component conventional in structure and well known in the prior art. The splitter 602A acts so as to apply the power from cable 604 to output cables 608, 610 and 612. The power which is output from the three-way splitter 602 onto the cable 608 is applied as input power to the floor box 606B. Correspondingly, power on cable 610 is applied as input power to floor box 606A. The cables 608 and 610 are conventional in structure and design, as are the floor boxes 606A and 606B.

The power applied from the three-way splitter 602A to the output cable 612 is applied as an input to the second three-way splitter 602B. Again, as with the three-way splitter 602A, the splitter 602B applies power on output cable 614, 616 and 620. Cable 616 applies power as an input to the floor box 618A, while cable 614 applies power as an input to floor box 618B. The same configuration exists for three-way splitter 602C, with power cables 622, 624 and 628, as well as floor boxes 626A and 626B. Power applied as an input on power cable 628 is further applied to the three-way splitter 602D. Splitter 602D applies power only to cables 630 and 632. These cables, correspondingly, apply power to floor boxes 684B and 684A, respectively.

In accordance with the foregoing, it should be noted that power is being applied to eight floor boxes. For such purposes, and excluding the input power cable 604, eleven power cables are required.

The prior art configuration as illustrated in FIG. 19 is distinguished from the floor access system 700 as illustrated in block diagram format in FIG. 20. More specifically, FIG. 20 illustrates external power being received on input cable 702. The input power in cable 702 is applied as an input to distribution box 704. Distribution box 704 may have a configuration substantially corresponding to one of the access floor modules 502 previously described herein. The distribution box 704 applies the external power from power cable 702 to cable assembly 706. Cable assembly 706 corresponds to one of the cable assemblies 578 previously described herein. The cable assembly 706 applies the power as an input to the floor box 708. Floor box 708 is structured as previously described herein with respect to the access floor module 502. Given this configuration, power can be applied to the floor box 712 through the interconnecting cable 710 between the floor box 708 and the floor box 712. That is, a separate cabling is not required between a zone or distribution box and the floor box 712.

For applying power to additional floor boxes in the form of access floor modules, power is applied through the floor box 708 on power cable 715 to the floor box 716. Correspondingly, interconnecting cabling is provided between floor box 716 and 720 through the interconnecting cable assembly 718, for purposes of supplying power to floor box 720. Further, power is supplied through the floor box 716 on cable assembly 722 to the floor box 724. An interconnecting cable 725 provides power through floor box 724 to floor box 726. Still further, power is supplied to the floor box 730 from floor box 724 through cable assembly 728. Correspondingly, power is supplied to floor box 734 from floor block 730 through interconnecting cable assembly 732.

As with the prior art system illustrated in FIG. 19, the access floor system 700 in accordance with the invention provides power for eight floor boxes. However, instead of requiring eleven separate cable assemblies, the access floor system 700, excluding the external input power cable 702, requires only eight cable assemblies. This configuration results in substantial savings to the user. Further, this configuration, which reduces the number of cables, uses cables which are all identical, except for possibly in length. Still further, each of the floor boxes illustrated in FIG. 20 can correspond to the access floor module 502 previously described herein. As apparent, the access floor system 700 in accordance with the invention, avoids the requirement of the three-way splitters of the prior art access floor system 600.

It will be apparent to those skilled in the pertinent arts that other embodiments of floor module systems in accordance with the invention can be designed. That is, the principles of floor access module systems in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The embodiments of the invention in which an exclusive property or privilege is claimed are defined as follows:

1. An electrical system adapted to be positioned under an access floor for supplying electrical power from at least one interconnected power source to selectively interconnected electrical devices, said electrical system comprising:
   a plurality of access floor modules selectively spaced under said access floor for providing conveniently located electrical power locations for energizing said electrical devices;
   a plurality of junction blocks, with each of said junction blocks being located internally of a different one of said plurality of access floor modules;
   a plurality of cable assemblies for electrically interconnecting each of said access floor modules optionally to said power source and/or to others of said access floor modules;
   releasable connection means associated with said junction blocks for releasably and electrically connecting said junction blocks to said cable assemblies;
   a plurality of electrical receptacle blocks, each receptacle block comprising at least one electrical receptacle releasably connectable to one or more of said electrical devices for supplying electrical power thereto, with each of said receptacle blocks further being electrically connectable to said junction blocks; and
   said electrical receptacle blocks are interchangeable with each other so as to provide said electrical system as a modular system which is adapted to be sized and configured in a manner which does not require any substantial number of different types of electrical equipment.

2. An electrical system in accordance with claim 1, characterized in that said junction blocks are interchangeable with each other, so as to permit installation of any of the junction blocks into any of the access floor modules.

3. An electrical system in accordance with claim 1, characterized in that at least a subset of said plurality of cable assemblies are each identical with others of said subset, with the exception of length.

4. An electrical system in accordance with claim 1, characterized in that:
   said electrical system further comprises cover means for providing covers to said plurality of access floor modules; and
   said cover means can be manually rotated between open and closed positions, without requiring any tools or other equipment.

5. An electrical system in accordance with claim 1, characterized in that:
   said electrical system further comprises cover means for providing covers to said plurality of access floor modules; and
   said cover means comprises a plurality of covers, each being a double-hinged cover for providing manual rotation between open and closed positions in either of two opposing directions.

6. An electrical system in accordance with claim 5, characterized in that said cover means provide for said manual rotation in two opposing directions without requiring any reversal or other realignment of said covers relative to said access floor modules.

7. An electrical system in accordance with claim 1, characterized in that each combination of one of said access floor modules and an interconnected one of said junction blocks can receive power through an interconnected one of said cable assemblies and pass said power through to at least two additional interconnected cable assemblies.

8. An electrical system in accordance with claim 7, characterized in that said combination of each of said access floor modules and interconnected junction blocks can apply power received from an interconnected cable assembly to another one of said combinations of said access floor modules and junction blocks through another interconnected cable assembly.

9. An electrical system in accordance with claim 1, characterized in that each of said junction blocks is mechanically connected to a corresponding one of to said floor access modules.

10. An electrical system in accordance with claim 1, characterized in that:
said electrical system further comprises cover means for covering tops of said access floor modules; and
said cover means and said access floor modules comprise means in the form of openings when said cover means are in closed positions, so as to provide means for extending cables or wires from interiors of said access floor modules to spatial areas above said access floor modules.

11. An electrical system in accordance with claim 1, characterized in that said system further comprises cover brackets positioned at upper locations of said access floor modules, and comprising opposing pairs of hinge pins for hingedly receiving covers for access floor modules.

12. An electrical system in accordance with claim 1, characterized in that:
said system further comprises a plurality of covers, with each of said covers being sized so as to provide a top cover for said floor access modules; and
each of said covers can be rotated to a first, open position where said cover will remain stationary in the absence of any external forces exerted thereon.

13. An electrical system in accordance with claim 1, characterized in that each of said junction blocks is a double-sided junction block, and provides for electrical interconnection of said electrical receptacle blocks on opposing sides of said junction blocks.

14. An electrical system in accordance with claim 1, characterized in that each of said junction blocks is of a length which provides for electrical interconnection of at least two of said electrical receptacle blocks on at least one side of said junction blocks.

15. An electrical system in accordance with claim 1, characterized in that when each of said junction blocks is installed in a corresponding one of said access floor modules, said junction blocks are centered relative to said access floor modules.

16. An electrical system in accordance with claim 13, characterized in that said centering of said junction blocks provides for electrical interconnection of said electrical receptacle blocks on opposing sides of said junction blocks.

17. An electrical system in accordance with claim 1, characterized in that each of said junction blocks comprises a pair of electrical connector sets on opposing ends of said junction blocks.

18. An electrical system in accordance with claim 1, characterized in that said cable assemblies are adjustable in length.

19. An electrical system in accordance with claim 1, characterized in that said electrical receptacle blocks comprise duplex electrical receptacles.

20. An electrical system in accordance with claim 1, characterized in that said electrical system further comprises:
voice/data or other communication ports; and
said communication ports are mechanically and releasably connected to at least one of said access floor modules.

21. An electrical system in accordance with claim 1, characterized in that said system further comprises conventional communications element mounting brackets mechanically connectable to at least one of said access floor modules.

22. An electrical system in accordance with claim 1, characterized in that all of said junction blocks and said cable assemblies are located below a surface of said access floor.

23. An electrical system in accordance with claim 1, characterized in that all portions of said junction blocks are located fully below a surface of said access floor.

24. An electrical system in accordance with claim 1, characterized in that said electrical receptacle blocks are releasably mechanically and electrically connectable to said junction blocks.

25. An electrical system in accordance with claim 1, characterized in that each of said junction blocks located within a corresponding one of said access floor modules is electrically connectable directly to others of said junction blocks associated with others of said access floor modules, in the absence of requiring any intermediate zone boxes for proper operation.

26. An electrical system in accordance with claim 1, characterized in that said electrical system comprises:
a first one of a first set of said plurality of access floor modules being connected to said power source through a first cable assembly;
remaining ones of said first one of said plurality of access floor modules being electrically connected in sequence to said first one of said first plurality of access floor modules through certain ones of said cable assemblies;
a first one of a second set of said plurality of access floor modules being electrically connected to said power source through one of said cable assemblies; and
remaining ones of said second set of said plurality of access floor modules being electrically connected in sequence to said first one of said second set of said plurality of access floor modules, through certain other ones of said cable assemblies.

27. An electrical system in accordance with claim 26, characterized in that said electrical system having said first set of said access floor modules and said second set of said access floor modules has an absence of any interconnected zone boxes.

28. An electrical system in accordance with claim 1, characterized in that:
said electrical receptacle block comprises at least a first set of electrical receptacle blocks and a second set of electrical receptacle blocks, with said first set of electrical receptacle blocks having a first circuit configuration different from a second circuit configuration of said second set of electrical receptacle blocks; and
each of said first set of electrical receptacle blocks and said second set of electrical receptacle blocks are interchangeable with each other so as to provide capability of changing circuits available through said electrical receptacles, without modifying said junction blocks or said cable assemblies.

29. An electrical system adapted to be positioned under an access floor for supplying electrical power from at least one interconnected power source to selectively interconnected electrical devices, said electrical system comprising:
a plurality of access floor modules selectively spaced under said access floor for providing conveniently located electrical power locations for energizing said electrical devices;

a plurality of junction blocks, with each of said junction blocks being located internally of a different one of said plurality of access floor modules;

a plurality of cable assemblies for electrically interconnecting each of said access floor modules optionally to said power source and/or to others of said access floor modules;

a plurality of electrical receptacle blocks, each receptacle block comprising at least one electrical receptacle releasably connectable to one or more of said electrical devices for supplying electrical power thereto, and with each of said receptacle blocks further being electrically connectable to said junction blocks;

said electrical receptacle blocks comprising at least a first set of electrical receptacle blocks and a second set of electrical receptacle blocks, with said first set of electrical receptacle blocks having a circuit configuration different from a circuit configuration of said second set of electrical receptacle blocks; and each of said first set of electrical receptacle blocks and said second set of electrical receptacle blocks are interchangeable with each other so as to provide capability of changing circuits available through said electrical receptacles, without modifying said junction blocks or said cable assemblies.

30. An electrical system in accordance with claim 29, characterized in that said first set of electrical receptacle blocks is interchangeable with said second set of electrical receptacle blocks while said access floor modules are positioned in their working locations under said access floor.

31. An electrical system in accordance with claim 29, characterized in that said first set of electrical receptacle blocks are interchangeable with said second set of electrical receptacle blocks, and connectable to said junction blocks without requiring the use of any tools or other equipment.

32. An electrical system in accordance with claim 29, characterized in that:

said system further comprises cover means for providing covers to said access floor modules; and said cover means comprise means for permitting extension of cables from the interior to the exterior of said access floor modules while said cover means are in closed positions.

* * * * *